United States Patent
Tonks et al.

(10) Patent No.: US 12,331,159 B2
(45) Date of Patent: Jun. 17, 2025

(54) POLYESTERS AND POLYKETOESTERS FROM CARBONYLATIVE TERPOLYMERIZATION OF ENOLS, METHODS TO PRODUCE, BLENDS, AND ARTICLES THEREFROM

(71) Applicants: ExxonMobil Chemical Patents Inc., Baytown, TX (US); Regents of the University of Minnesota, Minneapolis, MN (US)

(72) Inventors: Ian Tonks, Minneapolis, MN (US); Alex Edward Carpenter, Seabrook, TX (US)

(73) Assignees: Exxon Mobil Chemical Patents Inc., Baytown, TX (US); Regents of the University of Minnesota, Minneapolis, MN (US)

( * ) Notice: Subject to any disclaimer, the term of this patent is extended or adjusted under 35 U.S.C. 154(b) by 836 days.

(21) Appl. No.: 17/460,558

(22) Filed: Aug. 30, 2021

(65) Prior Publication Data
US 2022/0064375 A1 Mar. 3, 2022

Related U.S. Application Data

(60) Provisional application No. 63/072,962, filed on Sep. 1, 2020.

(51) Int. Cl.
*C08G 67/02* (2006.01)
(52) U.S. Cl.
CPC .................................. *C08G 67/02* (2013.01)

(58) Field of Classification Search
None
See application file for complete search history.

(56) References Cited

U.S. PATENT DOCUMENTS

| | | | | |
|---|---|---|---|---|
| 3,723,486 A | * | 3/1973 | Kajimoto | C07C 51/14 560/114 |
| 4,841,020 A | * | 6/1989 | Drent | C08G 67/02 528/223 |
| 4,948,865 A | | 8/1990 | Drent | |
| 5,025,092 A | | 6/1991 | Drent et al. | |
| 5,162,493 A | | 11/1992 | Drent | |
| 5,219,930 A | * | 6/1993 | Chang | C08F 8/06 525/61 |

(Continued)

FOREIGN PATENT DOCUMENTS

| | | |
|---|---|---|
| EP | 2258743 | 12/2010 |
| WO | 0049060 | 8/2000 |

OTHER PUBLICATIONS

Yee et al., "Mechanistic Study of Palladium-Catalyzed Hydroesterificative Copolymerization of Vinyl Benzyl Alcohol and CO," Organometallics, vol. 38, pp. 1778-1786 (2019) (Year: 2019).*

(Continued)

*Primary Examiner* — Ha S Nguyen
(74) *Attorney, Agent, or Firm* — Daniel N. Lundeen; Lundeen & Lundeen PLLC

(57) ABSTRACT

This invention relates to a polymerization process for producing a polyketoester, or an olefin-polyketoester utilizing a hydroesterification catalyst and an olefin-CO copolymerization catalyst in a reaction medium. Polyketoester copolymers and olefin-polyketoester copolymers are also disclosed.

29 Claims, 7 Drawing Sheets

(56) References Cited

U.S. PATENT DOCUMENTS 6,284,868 B1    9/2001    Geprags et al.
6,306,979 B1   10/2001   Queisser et al.

OTHER PUBLICATIONS

Liu et al., "A synthetic polyester from plant oil feedstock by functionalizing polymerization," Angewandte Chemie International Edition, vol. 58, pp. 3346-3350 (2019) (Year: 2019).*

Sen et al., "Palladium (II)-catalyzed alternating copolymerization and terpolymerization of carbon monoxide with α-olefins: formation of syndiotactic copolymers as wells terpolymers with both syndiotactic and atactic segments," Macromolecules, vol. 26, pp. 911-915 (1993) (Year: 1993).*

Auer et al., "Alternating copolymerization and terpolymerization of vinyl-substituted phenolic antioxidants with propene and carbon monoxide by a palladium(II)-based catalyst: polyketones containing intramolecular stabilizers," Polymer International, vol. 53, pp. 2015-2019 (2004) (Year: 2004).*

Gensch, T.; dos Passos Gomes, G.; Friederich, P.; Peters, E.; Gaudin, T.; Pollice, R.; Jorner, K.; Nigam, A.; Lindner-D'addario, M.; Sigman, M. S.; Aspuru-Guzik, A. A Comprehensive Discovery Platform for Organophosphorus Ligands for Catalysis. J. Am. Chem. Soc. 2022, 144, 1205-1217. Journal of the American Chemical Society, vol. 144, Issue 3_https://doi.org/10.1021/jacs.1c09718.

Lo, Shao-Yu, et al. "Carbonylative Co-and Terpolymerizations of 10-Undecen-1-ol: A Route to Polyketoesters with Tunable Compositions." ACS Catalysis 12.23 (2022): 14629-14636, available at https://www.osti.gov/servlets/purl/1903106.

Kiss, G. Palladium-Catalyzed Reppe Carbonylation. Chem. Rev. 2001, 101 (11), 3435-3456. Chemical Reviews, vol. 101, Issue 11, p. 3435-3456_https://doi.org/10.1021/cr010328q.

Zoeller, J. R.; Agreda, V. H.; Cook, S. L.; Lafferty, N. L.; Polichnowski, S. W.; Pond, D. M. Eastman Chemical Company Acetic Anhydride Process. Catal. Today 1992, 13 (1), 73-91. Catalysis Today, vol. 13, Issue 1_https://doi.org/10.1016/0920-5861(92)80188-s.

Sunley, G. J.; Watson, D. J. High Productivity Methanol Carbonylation Catalysis Using Iridium: The CativaTM Process for the Manufacture of Acetic Acid. Catal. Today 2000, 58 (4), 293-307.

Franke, R.; Selent, D.; Borner, A. Applied Hydroformylation. Chem. Rev. 2012, 112 (11), 5675-5732. Chemical Reviews, vol. 112, Issue 11_https://doi.org/10.1021/cr3001803.

Ingenia—Acrylics for the future. https://www.ingenia.org.uk/Ingenia/Issue-45/Acrylics-for-thefuture (accessed Jun. 27, 2021).

Drent, E.; van Dijk, R.; van Ginkel, R.; van Oort, B.; Pugh, R. I. The First Example of Palladium Catalysed Non-Perfectly Alternating Copolymerisation of Ethene and Carbon Monoxide. Chem. Commun. 2002, 2 (9), 964-965. Chemical Communications, Issue 9_https://doi.org/10.1039/b111629k.

Chen, S.-Y.; Pan, R.-C.; Chen, M.; Liu, Y.; Chen, C.; Lu, X.-B. Synthesis of Nonalternating Polyketones Using Cationic Diphosphazane Monoxide-Palladium Complexes. J. Am. Chem. Soc. 2021, 143 (28), 10743-10745. Journal of the American Chemical Society, vol. 143, Issue 28_https://doi.org/10.1021/jacs.1c04964.

Baur, M.; Lin, F.; Morgen, T. O.; Odenwald, L.; Mecking, S. Polyethylene Materials with In-Chain Ketones from Nonalternating Catalytic Copolymerization. Science. 2021, 374 (6567), 604-607. Science, vol. 374, Issue 6567_https://doi.org/10.1126/science.abi8183.

Li, H.; Dong, K.; Jiao, H.; Neumann, H.; Jackstell, R.; Beller, M. The Scope and Mechanism of Palladium-Catalysed Markovnikov Alkoxycarbonylation of Alkenes. Nat. Chem. 2016, 8, 1159-1166. Nature Chemistry, vol. 8, Issue 12_https://doi.org/10.1038/nchem.2586.

Yang, J.; Liu, J.; Neumann, H.; Franke, R.; Jackstell, R.; Beller, M. Direct Synthesis of Adipic Acid Esters via Palladium-Catalyzed Carbonylation of 1,3-Dienes. Science. 2019, 366 (6472), 1514-1517. Science, vol. 366, Issue 6472_https://doi.org/10.1126/science.aaz1293.

Pandey, S.; Raj, K. V.; Shinde, D. R.; Vanka, K.; Kashyap, V.; Kurungot, S.; Vinod, C. P.; Chikkali, S. H. Iron Catalyzed Hydroformylation of Alkenes under Mild Conditions: Evidence of an Fe(II) Catalyzed Process. J. Am. Chem. Soc. 2018, 140 (12), 44304439. Journal of the American Chemical Society, vol. 140, Issue 12_https://doi.org/10.1021/jacs.8b01286.

Hood, D. M.; Johnson, R. A.; Carpenter, A. E.; Younker, J. M.; Vinyard, D. J.; Stanley, G. G. Highly Active Cationic Cobalt(II) Hydroformylation Catalysts. Science. 2020, 367 (6477), 542-548. Science, vol. 367, Issue 6477_https://doi.org/10.1126/science.aaw7742.

W. N. M. van Leeuwen, P.; A. Zuideveld, M.; H. G. Swennenhuis, B.; Freixa, Z.; C. J. Kamer, P.; Goubitz, K.; Fraanje, J.; Lutz, M.; L. Spek, A. Alcoholysis of Acylpalladium(II) Complexes Relevant to the Alternating Copolymerization of Ethene and Carbon Monoxide and the Alkoxycarbonylation of Alkenes: The Importance of CisCoordinating Phosphines. J. Am. Chem. Soc. 2003, 125 (18), 55235539. Journal of the American Chemical Society, vol. 125, Issue 18_https://doi.org/10.1021/ja029341y.

Fanjul, T.; Eastham, G.; Fey, N.; Hamilton, A.; Orpen, A. G.; Pringle, P. G.; Waugh, M. Palladium Complexes of the Heterodiphosphine oC6H4(CH2PtBu2)(CH2PPh2) Are Highly Selective and Robust Catalysts for the Hydromethoxycarbonylation of Ethene. Organometallics 2010, 29 (10), 2292-2305. Organometallics, vol. 29, Issue 10_https://doi.org/10.1021/om100049n.

Stempfle, F.; Ortmann, P.; Mecking, S. Long-Chain Aliphatic Polymers To Bridge the Gap between Semicrystalline Polyolefins and Traditional Polycondensates. Chem. Rev. 2016, 116 (7), 4597-4641 2016. Chemical Reviews, vol. 116, Issue 7_https://doi.org/10.1021/acs.chemrev.5b00705.

Drent, E.; Van Broekhoven, J. A. M.; Doyle, M. J. Efficient Palladium Catalysts for the Copolymerization of Carbon Monoxide with Olefins to Produce Perfectly Alternating Polyketones. J. Organomet. Chem. 1991, 417 (1-2), 235-251. Journal of Organometallic Chemistry, vol. 417, Issue 1-2_https://doi.org/10.1016/0022-328x(91)80176-k.

Drent, E.; H. M. Budzelaar, P. Palladium-Catalyzed Alternating Copolymerization of Alkenes and Carbon Monoxide. Chem. Rev. 1996, 96 (2), 663-682. Chemical Reviews, vol. 96, Issue 2_https://doi.org/10.1021/cr940282j.

Dekker, G. P. C. M.; Elsevier, C. J.; Vrieze, K.; Van Leeuwen, P. W. N. M. Influence of Ligands and Anions on the Rate of Carbon Monoxide Insertion into Palladium-Methyl Bonds in the Complexes (PP)Pd(CH3)Cl and [(P-P)Pd(CH3) (L)]+SO3CF3- (P-P = Dppe, Dppp, Dppb, Dppf; L = CH3CN, PPh3). Organometallics 2002, 11 (4), 1598-1603. Organometallics, vol. 11, Issue 4_https://doi.org/10.1021/om00040a034.

Knight, J. G.; Doherty, S.; Harriman, A.; Robins, E. G.; Betham, M.; Eastham, G. R.; Tooze, R. P.; Elsegood, M. R. J.; Champkin, P.; Clegg, W. Remarkable Differences in Catalyst Activity and Selectivity for the Production of Methyl Propanoate versus CO-Ethylene Copolymer by a Series of Palladium Complexes of Related C4-Bridged Diphosphines. Organometallics 2000, 19 (24), 4957-4967. Organometallics, vol. 19, Issue 24https://doi.org/10.1021/om000688o.

Drent, E.; Mul, W. P.; Smaardijk, A. A. Polyketones. In Encyclopedia of Polymer Science and Technology. John Wiley & Sons, Inc, 2001; pp. 678-703.

Vondran, J.; Furst, M. R. L.; Eastham, G. R.; Seidensticker, T.; ColeHamilton, D. J. Magic of Alpha: The Chemistry of a Remarkable Bidentate Phosphine, 1,2-Bis(Di-TertButylphosphinomethyl)Benzene. Chem. Rev. 2021, 121 (11), 66106653. Chemical Reviews, vol. 121, Issue 11_https://doi.org/10.1021/acs.chemrev.0c01254.

Liu, Ye and Mecking, Stefan, A Synthetic Polyester from Plant oil Feedstock by Functionalizing Polymerization; Angew. Chem. Int. Ed. 2019, 58, 3346-3350.

Clegg, W.; Eastham, G. R.; Elsegood, M. R. J.; Tooze, R. P.; Wang, X. L.; Whiston, K. Highly Active and Selective Catalysts for the Production of Methyl Propanoate via the Methoxycarbonylation of Ethene. Chem. Commun. 1999, 18, 1877-1878 Chemical Communications, Issue 18_https://doi.org/10.1039/a905521e.

Folster, C. P.; Harkins, R. P.; Lo, S.-Y.; Sachs, J. D.; Tonks, I. A. Development and Applications of Selective Hydroesterification

(56) References Cited

OTHER PUBLICATIONS

Reactions. Trends Chem. 2021, 3 (6), 469-484. Trends in Chemistry, vol. 3, Issue 6_https://doi.org/10.1016/j.trechm.2021.03.002.

Jiang, Z.; Dahlen, G. M.; Houseknecht, K.; Sen, A. Palladium(II)Catalyzed Alternating Copolymerization of Carbon Monoxide with aOlefins: Synthetic and Mechanistic Aspects. Macromolecules 1992, 25, 2999-3001. Macromolecules, vol. 25, Issue 11https://doi.org/10.1021/ma00037a035.

Freixa, Z.; Van Leeuwen, P. W. N. M. Bite Angle Effects in Diphosphine Metal Catalysts: Steric or Electronic? Dalton Trans. 2003, 10, 1890-1901.

Dong, K.; Sang, R.; Wei, Z.; Liu, J.; Uhren, R. D.; Spannenberg, A.; Jiao, H .; Neumann, H.; Jackstell, R.; Franke, R.; Beller, M. Cooperative Catalytic Methoxycarbonylation of Alkenes: Uncovering the Role of Palladium Complexes with Hemilabile Ligands. Chem. Sci. 2018, 9, 2510-2516 Chemical Science, vol. 9, Issue 9_https://doi.org/10.1039/c7sc02964k.

Han, X.-W.; Daugulis, O.; Brookhart, M. Unsaturated Alcohols as Chain-Transfer Agents in Olefin Polymerization: Synthesis of Aldehyde End-Capped Oligomers and Polymers. J. Am. Chem. Soc. 2020, 142 (36), 15431-15437 Journal of the American Chemical Society, vol. 142, Issue 36_https://doi.org/10.1021/jacs.0c06644.

Doherty, N. M.; Bercaw, J. E. Kinetics and Mechanism of the Insertion of Olefins into Transition-Metal—Hydride Bonds. J. Am. Chem. Soc. 1985, 107 (9), 2670-2682. Journal of the American Chemical Society, vol. 107, Issue 9_https://doi.org/10.1021/ja00295a020.

\* cited by examiner

POLYESTERS AND POLYKETOESTERS FROM CARBONYLATIVE TERPOLYMERIZATION OF ENOLS, METHODS TO PRODUCE, BLENDS, AND ARTICLES THEREFROM

This application is a nonprovisional of and claims the benefit of priority to U.S. Ser. No. 63/072,962, filed Aug. 31, 2020.

FIELD

This invention relates to polyesters and polyketoester produced from olefin-CO copolymerization by olefin/CO copolymerization and olefin hydroesterification. In particular embodiments, wherein a monomer can serve as both an olefin/CO copolymerization monomer and an α,ω-enol as a hydroesterification chain transfer agent.

BACKGROUND

Olefin-CO copolymerization and hydroesterification are known methods of producing polymers which proceed through the same catalytic intermediate, a metal-acyl. However, copolymerization and hydroesterification are run in different solvents due to the incompatibility of the various catalyst used in each of the respective processes. There is need in the art for new polymers having properties suitable for various end uses.

SUMMARY

In embodiments of the invention, a polymerization process comprises contacting an alpha-omega enol having the general formula:

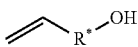

wherein R* is a divalent hydrocarbyl, a divalent hydrocarbyl substituted with one or more functional group comprising elements from Group 13-17 of the periodic table of the elements, or a combination thereof; and carbon monoxide (CO) in the presence of a hydroesterification catalyst and an olefin-CO copolymerization catalyst in a reaction medium within a reactor at a temperature, a CO pressure, and for a period of time sufficient to produce a polyketoester having an empirical formula:

$$(A)_a(B)_b(C)_c(D)_d$$

wherein a>0, b≥0, c>0, and d≥0; moieties A, B, C, and D may be arranged randomly, in blocks, or in any order; moiety A having the general formula:

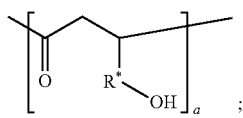

moiety B having the general formula:

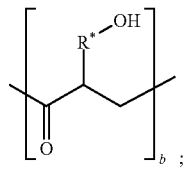

moiety C having the general formula:

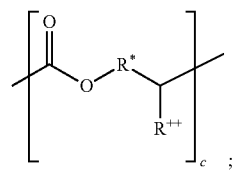

and
moiety D having the general formula:

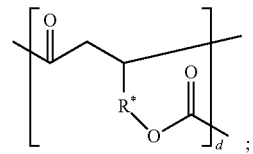

wherein $R^{++}$ is H, or a polyketoester chain having the empirical formula $(A)_a (B)_b (C)_c (D)_d$;
wherein a>0, b≥0, c>0, and d≥0.

In embodiments of the invention, a polymerization process comprises contacting an alpha-omega enol having the general formula:

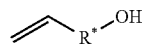

wherein R* is a divalent hydrocarbyl, a divalent hydrocarbyl substituted with one or more functional group comprising elements from Group 13-17 of the periodic table of the elements, or a combination thereof; an alpha olefin having the general formula:

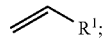

wherein $R^1$ is H or a hydrocarbyl comprising 1 to 18 carbon atoms, and carbon monoxide (CO) in the presence of a hydroesterification catalyst and an olefin-CO copolymerization catalyst in a reaction medium within a reactor at a temperature, a CO pressure, and for a period of time sufficient to produce an olefin-polyketoester or a branched olefin-polyketoester having an empirical formula:

$$(A)_a(B)_b(C)_c(D)_d(E)_e$$

wherein a>0, b≥0, c>0, d≥0; and e>0;
moieties A, B, C, D and E may be arranged randomly, in blocks, or in any order;

moiety A having the general formula:

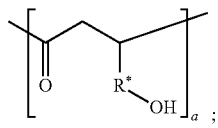

moiety B having the general formula:

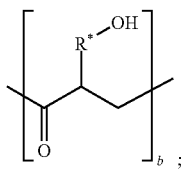

moiety C having the general formula:

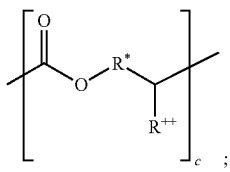

and
moiety D having the general formula:

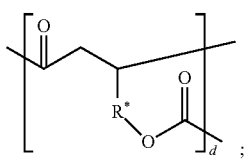

moiety E having the general formula:

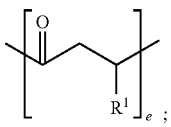

and
wherein $R^{++}$ is H, or a polyketoester chain having the empirical formula $(A)_a (B)_b (C)_c (D)_d (E)_e$; wherein $a>0$, $b≥0$, $c>0$, $d≥0$; and $e>0$.

In an embodiment of the invention, a polyketoester has an empirical formula:

$$(A)_a(B)_b(C)_c(D)_d$$

wherein:
  $a>0$, $b≥0$, $c>0$, and $d≥0$, and
  $a+b+c+d>100$;
  moieties A, B, C, and D may be arranged randomly, in blocks, or in any order;

moiety A has the general formula:

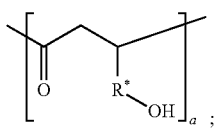

moiety B having the general formula:

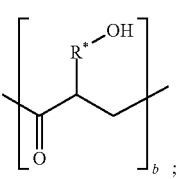

moiety C having the general formula:

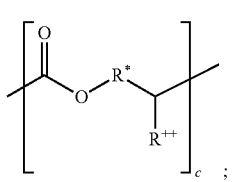

moiety D having the general formula:

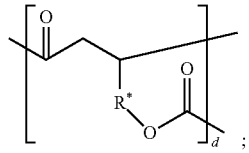

$R^{++}$ is H, or a polyketoester chain having the empirical formula:

$$(A)_a(B)_b(C)_c(D)_d \text{ wherein } a>0, b≥0, c>0, \text{ and } d≥0.$$

In an embodiment of the invention, an olefinic-polyketoester has an empirical formula:

$$(A)_a(B)_b(C)_c(D)_d(E)_e$$

wherein:
  $a>0$, $b≥0$, $c>0$, $d≥0$, and $e>0$; $a+b+c+d+e>100$;
  moieties A, B, C, D and E may be arranged randomly, in blocks, or in any order;
  moiety A has the general formula:

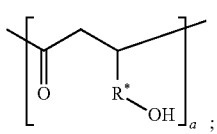

moiety B having the general formula:

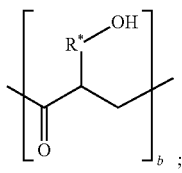

moiety C having the general formula:

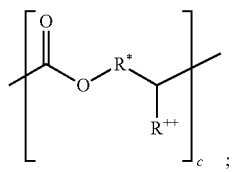

moiety D having the general formula:

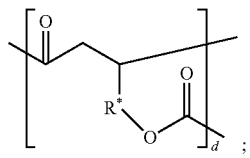

moiety E having the general formula:

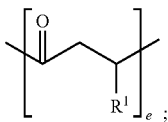

$R^1$ is H or a hydrocarbyl comprising 1 to 18 carbon atoms; and $R^{++}$ is H, or a polyketoester chain having the empirical formula:

$(A)_a(B)_b(C)_c(D)_d(E)_e$ wherein $a>0$, $b \geq 0$, $c>0$, $d \geq 0$; and $e>0$.

BRIEF DESCRIPTION OF THE FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
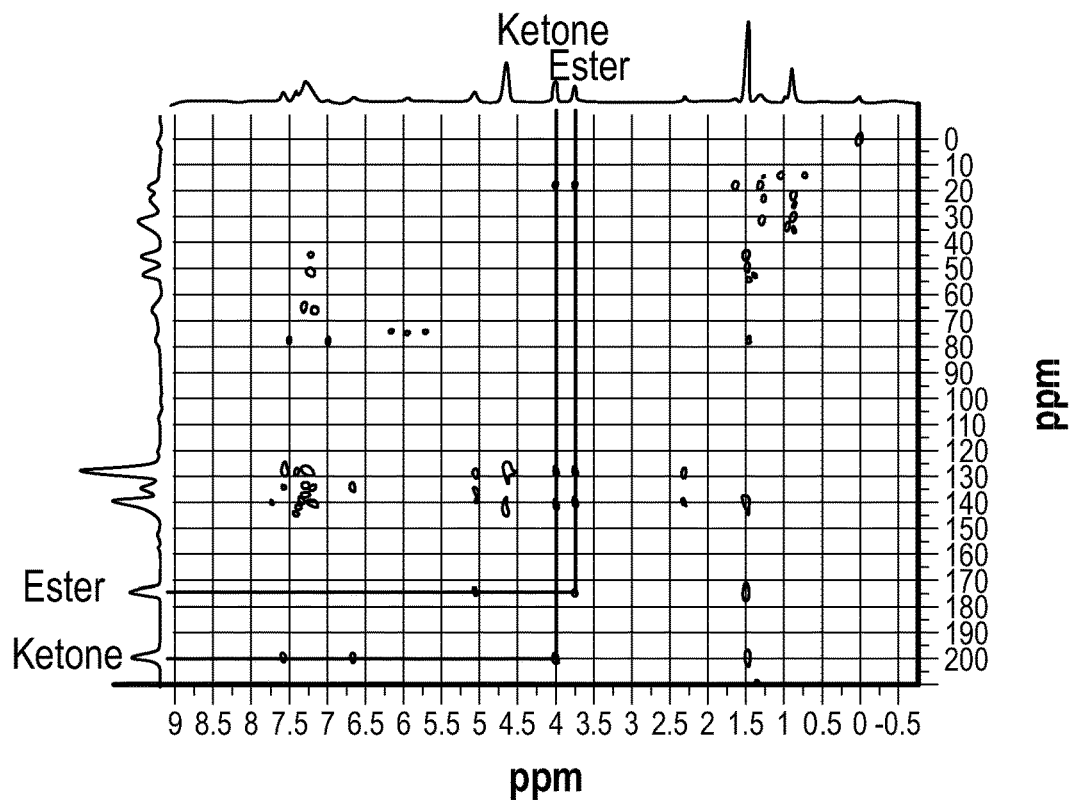
FIG. 1A is a $^1H$-$^{13}C$ HMBC NMR indicating both polyketone and polyester resonances in the resulting polymer of a tandem catalysis with VBA according to embodiments of the invention.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

Definitions

For the purposes of this invention and the claims thereto, the new numbering scheme for the Periodic Table Groups is used as described in CHEMICAL AND ENGINEERING NEWS, 63(5), pg. 27 (1985). Therefore, a "Group 4 metal" is an element from Group 4 of the Periodic Table, e.g. Hf, Ti, or Zr.

An "olefin," alternatively referred to as an "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized from of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based on the total weight of the copolymer. A "polymer" has two or more of the same or different mer units. A "homopolymer"

is a polymer having mer units that are the same. A "copolymer" is a polymer having two or more mer units that are different from each other. A "terpolymer" is a polymer having three mer units that are different from each other. A "tetrapolymer" is a polymer having four mer units that are different from each other. Accordingly, the definition of copolymer, as used herein, includes terpolymers, tetrapolymers and the like. "Different" as used herein in reference to mer units indicates that the mer units differ from each other by at least one atom or are different isomerically.

The terms "alpha-olefin" and "α-olefin" are used interchangeably and refer to an olefin having a terminal carbon-to-carbon double bond in the structure thereof (($R^1R^2$)—C=$CH_2$, where $R^1$ and $R^2$ can independently be hydrogen or any hydrocarbyl group; preferably $R^1$ is hydrogen and $R^2$ is an alkyl group). A "linear alpha-olefin" is an alpha-olefin defined where $R^1$ is hydrogen and $R^2$ is hydrogen or a linear alkyl group. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexene, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinyl cyclopentane, 1,2-divinylcyclohexane, 1,3-divinyl cyclo ° hexane, 1,4-divinylcyclohexane, 1,5-divinyl cyclo ° octane, 1-allyl-4-vinylcyclohexane, 1,4-diallylcyclohexane, 1-allyl-5-vinylcyclooctane, and 1,5-diallylcyclooctane.

For purposes of this disclosure, ethylene is considered to be an α-olefin when alone or used in combination with one or more different α-olefins.

As used herein, and unless otherwise specified, the term "$C_n$" means hydrocarbon(s) having "n" carbon atom(s) per molecule, where n is a positive integer. Likewise, a "$C_m$-$C_y$" group or compound refers to a group or compound comprising carbon atoms at a total number thereof in the range from m to y inclusive. Thus, a $C_1$-$C_4$ alkyl group refers to an alkyl group that includes carbon atoms at a total number thereof in the range of 1 to 4, e.g., 1, 2, 3 and 4; methyl, ethyl, propyl, and butyl.

An electron neutral molecule refers to a molecule having a formal charge of zero (0). Accordingly, in an electron neutral molecule, the number of valence electrons is equal to the number of valence electrons possible around the atoms in the molecule. Likewise, the number of substituents required to make a molecule represented by a structure electron neutral is the total number of possible for the particular arrangement according to common understanding and formalism in the art. For example, in the following structure:

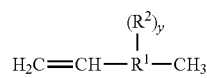

to make the molecule electron neutral when the $R^1$ moiety is a single oxygen atom having a valance of −2, y=0, when the $R^1$ moiety is a single nitrogen atom having a valance of −3, y=1,
when the $R^1$ moiety is a single carbon atom having a valance of −4, y=2;
when the $R^1$ moiety has 2 carbon atoms, y=4; and so on. Likewise, in the event the $R^1$ moiety is a metal (M), when M has a valance of 3, y=1; valance of 4, y=2, and so on.

The terms "moiety", "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

Unless otherwise indicated, (e.g., the definition of "substituted hydrocarbyl"), the term "substituted" means that at least one hydrogen atom has been replaced with at least one non-hydrogen group, such as another hydrocarbyl group, a heteroatom, or a heteroatom containing group, such as halogen (such as Br, Cl, F or I) or at least one functional group such as —NR*2, —CONR*$_2$, —NR*—CO—R*, —OR*, *—O—CO—R*, —CO—O—R*, —SeR*, —TeR*, —PR*$_2$, —PO—(OR*)$_2$, —O—PO—(OR*)$_2$, —AsR*2, —SbR*2, —SR*, *, —SO$_a$R$_b$*(a=2 or 3, b=1 or 2), —SO$_2$—(OR*)$_2$, —BR*$_2$, —SiR*$_3$, —GeR*$_3$, —SnR*$_3$, —PbR*$_3$, —(CH$_2$)$_q$—SiR*$_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom including halogen, e.g., Br, Cl, F or I, and/or a heteroatom-containing group wherein examples include —NR*$_2$, —CONR*$_2$, —NR*—CO—R*, —OR*, *—O—CO—R*, —SeR*, —TeR*, —PR*$_2$, —PO—(OR*)$_2$, —O—PO—(OR*)$_2$, —AsR*$_2$, —SbR*$_2$, —SR*, *, —SO$_a$R$_b$*(a=2 or 3, b=1 or 2), —SO$_2$—(OR*)$_2$, —BR*$_2$, —SiR*$_3$, —GeR*$_3$, —SnR*$_3$, —PbR*$_3$, —(CH$_2$)$_q$—SiR*$_3$, or a combination thereof, where q is 1 to 10 and each R* is independently hydrogen, a hydrocarbyl or a $C_1$-$C_{20}$ halocarbyl radical, wherein two or more R* may join together to form a substituted or unsubstituted completely saturated, partially unsaturated, or aromatic cyclic or polycyclic ring structure), or where at least one heteroatom has been inserted within a hydrocarbyl ring.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring in which a carbon is replaced with an oxygen and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group (as further described in the definition of "substituted" herein).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

As used herein, a "catalyst" includes a single catalyst, or multiple catalysts. Catalysts can have isomeric forms such as conformational isomers or configurational isomers. Conformational isomers include, for example, conformers and rotamers. Configurational isomers include, for example, stereoisomers.

The term "complex," may also be referred to as catalyst precursor, precatalyst, catalyst, catalyst compound, transition metal compound, or transition metal complex. These words are used interchangeably. Activator and cocatalyst are also used interchangeably.

The following abbreviations may be used herein: Me is methyl, Ph is phenyl, Et is ethyl, Pr is propyl, iPr is isopropyl, n-Pr is normal propyl, Bu is butyl, i-Bu is isobutyl, tBu is tertiary butyl, n-Bu is normal butyl, MAO is methylalumoxane, Bn is benzyl (i.e., $CH_2Ph$), RT is room temperature (and is 23° C. unless otherwise indicated), $CF_3SO_3-$ is triflate, and Cy is cyclohexyl.

An "anionic ligand" is a negatively charged ligand that donates one or more pairs of electrons to a metal ion. A "neutral donor ligand" is a neutrally charged ligand which donates one or more pairs of electrons to a metal ion.

As used herein, a "catalyst system" includes at least one catalyst compound and an activator. A catalyst system of the present disclosure can further include a support material and an optional co-activator. For the purposes of this disclosure, when a catalyst is described as including neutral stable forms of the components, it is well understood by one of ordinary skill in the art, that the ionic form of the component is the form that reacts with the monomers to produce polymers. Furthermore, catalysts of the present disclosure represented by a formula are intended to embrace ionic forms thereof of the compounds in addition to the neutral stable forms of the compounds. Furthermore, activators of the present disclosure are intended to embrace ionic/reaction product forms thereof of the activator in addition to ionic or neutral form.

An "anionic leaving group" is a negatively charged group that donates one or more pairs of electrons to a metal ion, that can be displaced by monomer or activator.

A "scavenger" is a compound that can be added to a reactor to facilitate polymerization by scavenging impurities. Some scavengers may also act as activators and may be referred to as co-activators. A co-activator, that is not a scavenger, may also be used in conjunction with an activator in order to form an active catalyst. In at least one embodiment, a co-activator is pre-mixed with the transition metal compound to form an alkylated transition metal compound. Examples of scavengers include trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride, and free-radical scavengers such as antioxidants (e.g., octadecyl 3-(3,5-di-tert-butyl-4-hydroxyphenyl)propionate also referred to as Irganox™ 1076, available from Ciba-Geigy).

The term "alkenyl" means a straight-chain, branched-chain, or cyclic hydrocarbon radical having one or more double bonds. These alkenyl radicals may be optionally substituted. Examples of suitable alkenyl radicals include ethenyl, propenyl, allyl, 1,4-butadienyl cyclopropenyl, cyclobutenyl, cyclopentenyl, cyclohexenyl, cyclooctenyl, including their substituted analogues.

The term "alkoxy" or "alkoxide" means an alkyl ether radical wherein the term alkyl is as defined above. Examples of suitable alkyl ether radicals include methoxy, ethoxy, n-propoxy, iso-propoxy, n-butoxy, iso-butoxy, sec-butoxy, tert-butoxy, and phenoxyl.

The term "aryl" or "aryl group" includes a $C_4$-$C_{20}$ aromatic ring, such as a six-carbon aromatic ring, and the substituted variants thereof, including phenyl, 2-methylphenyl, xylyl, 4-bromo-xylyl. Likewise heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

The terms "aryloxy" and "aryloxide" mean an aryl group bound to an oxygen atom, such as an aryl ether group/radical connected to an oxygen atom and can include those where the aryl group is a $C_1$ to $C_{10}$ hydrocarbyl. Examples of suitable aryloxy radicals can include phenoxy, and the like.

The terms "hydrosilylcarbyl radical," "hydrosilylcarbyl group," or "hydrosilylcarbyl" interchangeably refers to a group consisting of hydrogen, carbon, and silicon atoms only. A hydrosilylcarbyl group can be saturated or unsaturated, linear or branched, cyclic or acyclic, aromatic or non-aromatic, and with the silicon atom being within and/or pendant to the cyclic/aromatic rings.

The term "silyl group," refers to a group comprising silicon atoms, such as a hydrosilylcarbyl group.

For purposes herein, a "ring carbon atom" is a carbon atom that is part of a cyclic ring structure. By this definition, a benzyl group has six ring carbon atoms and para-methylstyrene also has six ring carbon atoms.

The term "ring atom" means an atom that is part of a cyclic ring structure. By this definition, a benzyl group has six ring atoms, all of which are carbon, and tetrahydrofuran has 5 ring atoms, 4 carbon ring atoms and one oxygen ring atom.

Where isomers of a named alkyl, alkenyl, alkoxide, or aryl group exist (e.g., n-butyl, iso-butyl, iso-butyl, and tert-butyl) reference to one member of the group (e.g., n-butyl) shall expressly disclose the remaining isomers (e.g., n-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tut-butyl).

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

The term "continuous" means a system that operates without interruption or cessation. For example, a continuous process to produce a polymer would be one where the reactants are continually introduced into one or more reactors and polymer product is continually withdrawn during a polymerization process.

Herein, "catalyst precursor", "catalyst" and/or "catalyst complex" are used interchangeably.

For purposes herein hydroesterification refers to the general reaction pathway

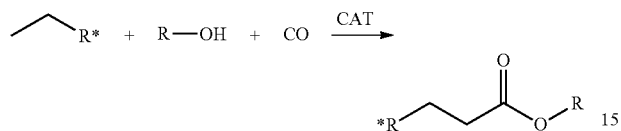

Olefin/CO copolymerization refers to the general reaction pathway:

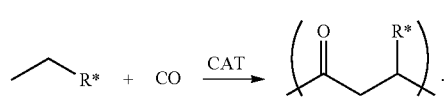

Applicant has discovered that it is possible to perturb olefin-CO copolymerization catalysis by employing a chain transfer agent comprising a functional group capable of both copolymerization (an olefinic functional group) and hydroesterification (an alcohol functional group), which in an embodiment is an alpha-omega enol. This discovery results in a new synthetic route to produce previously unknown polyesters, branched polyesters, polyketoesters, branched polyketoesters, olefinic polyketoester copolymers, branched olefinic polyketoester copolymers, and the like. In embodiments, the branching results in long-chain branching comprising 7 or more carbon atoms. Controlled degrees of branching may be useful in enhancing the rheological attributes of the resulting polymer so as to make it more useful (e.g., shear-thinning behavior and processibility). Applicant's combined two very well-known, yet typically mutually exclusive catalytic processes—olefin/CO copolymerization and olefin hydroesterification—which proceed through the same catalytic intermediate, a metal-acyl. Through this approach, applicant discovered it to be possible to identify catalyst structural and electronic parameters allowing for control over polymerization vs chain transfer ratios, wherein highly active catalysts result in tunable polymer properties.

In embodiments, a polymerization process comprises the steps of contacting an alpha-omega enol having the general formula:

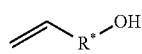

wherein R* is a divalent hydrocarbyl, a divalent hydrocarbyl substituted with one or more functional group comprising elements from Group 13-17 of the periodic table of the elements, or a combination thereof; with carbon monoxide (CO) in the presence of a hydroesterification catalyst and an olefin-CO copolymerization catalyst in a reaction medium within a reactor at a temperature, a CO pressure, and for a period of time sufficient to produce a polyketoester having an empirical formula:

$(A)_a(B)_b(C)_c(D)_d$ wherein a>0, b≥0, c>0, and d≥0;
moieties A, B, C, and D may be arranged randomly, in blocks, or in any order;
moiety A having the general formula:

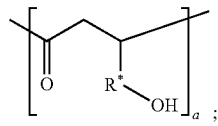

moiety B having the general formula:

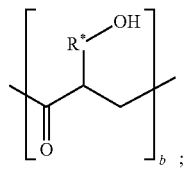

moiety C having the general formula:

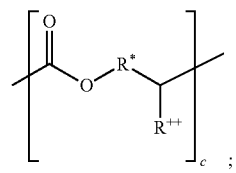

and
moiety D having the general formula:

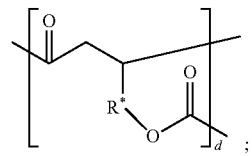

wherein $R^{++}$ is H, or a polyketoester chain having the empirical formula $(A)_a (B)_b (C)_c (D)_d$;
wherein a>0, b≥0, c>0, and d≥0.

As shown above, the polymer may include a 1,2 insertion, a 2,1 insertion, free alcohol moieties, branched moieties via hydroesterification, or a combination thereof.

In an alternative embodiment, the of process, the reaction medium further comprises an alpha olefin having the general formula:

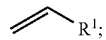

wherein $R^1$ is H or a hydrocarbyl comprising 1 to 18 carbon atoms, to produce an olefin-polyketoester or a branched olefin-polyketoester having an empirical formula:

$(A)_a(B)_b(C)_c(D)_d(E)_e$ wherein a>0, b≥0, c>0, d≥0; and e>0;

wherein moieties A, B, C, D and E may be arranged randomly, in blocks, or in any order;

wherein moieties A, B, C, D are defined as above, and moiety E has the general formula:

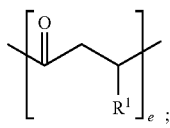

and wherein R⁺⁺ is H, or an olefin-polyketoester chain having the empirical formula $(A)_a (B)_b (C)_c (D)_d (E)_e$; wherein a>0, b≥0, c>0, d≥0; and e>0.

In one or more embodiments of the process, R* is a linear or branched divalent alkane radical having 1 to 19 carbon atoms. In some embodiments, R* comprises at least one divalent ring system according to the general formula:

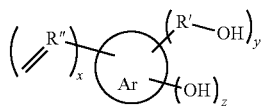

wherein Ar represents a cyclic or an aromatic ring system, each R', when present, is a divalent hydrocarbyl, a divalent hydrocarbyl substituted with one or more functional group comprising elements from Group 13-17 of the periodic table of the elements, or a combination thereof; wherein each R" is a divalent hydrocarbyl, a divalent hydrocarbyl substituted with one or more functional groups comprising elements from Group 13-17 of the periodic table of the elements, or a combination thereof;

x≥1; and y+z≥1.

In a preferred embodiment, the alpha-omega enol has the general formula:

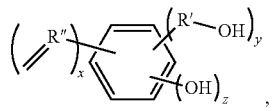

and/or wherein each R', when present, is a divalent hydrocarbyl, a divalent hydrocarbyl substituted with one or more functional group comprising elements from Group 13-17 of the periodic table of the elements, or a combination thereof; wherein each R" is a divalent hydrocarbyl, a divalent hydrocarbyl substituted with one or more functional groups comprising elements from Group 13-17 of the periodic table of the elements, or a combination thereof;

x is from 1 to 5;

y+z is from 1 to 5; and x+y+z≥2.

In particular embodiments, the alpha-omega enol is according to the formula:

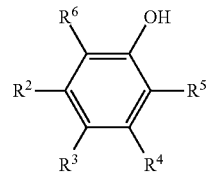

wherein each of $R^2$, $R^3$, $R^4$, $R^5$ and $R^6$ is, independently, a hydrogen, a $C_1$-$C_{20}$ hydrocarbyl radical, a functional group comprising elements from Group 13-17 of the periodic table of the elements, or a combination thereof, or wherein two or more of $R^2$, $R^3$, $R^4$, $R^5$ and $R^6$ independently join together to form a $C_4$ to $C_{62}$ cyclic or polycyclic ring structure subject to the proviso that at least one of $R^2$, $R^3$, $R^4$, $R^5$ and $R^6$ comprise a moiety having a terminal carbon-carbon double bond. In other particular embodiments, the alpha-omega enol is according to the formula:

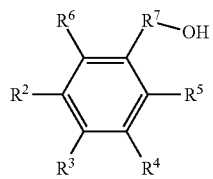

wherein x is from 1 to 20; each of $R^2$, $R^3$, $R^4$, $R^5$ and $R^6$ is, independently, a hydrogen, a $C_1$-$C_{20}$ hydrocarbyl radical, a functional group comprising elements from Group 13-17 of the periodic table of the elements, or a combination thereof, or wherein two or more of $R^2$, $R^3$, $R^4$, $R^5$ and $R^6$ independently join together to form a $C_4$ to $C_{62}$ cyclic or polycyclic ring structure; and $R^7$ is a divalent $C_1$-$C_{20}$ hydrocarbyl radical, a divalent functional group comprising elements from Group 13-17 of the periodic table of the elements, subject to the proviso that at least one of $R^2$, $R^3$, $R^4$, $R^5$ and $R^6$ comprises a moiety having a terminal carbon-carbon double bond (e.g., a terminal vinyl).

In one or more embodiments, the olefin-CO copolymerization catalyst, the hydroesterification catalyst, or both comprise a metal from Groups 8, 9, or 10 of the periodic table of elements. In some embodiments each of the olefin-CO copolymerization catalyst, the hydroesterification catalyst, or both independently comprise Ni or Pd.

In one or more embodiments, the hydroesterification catalyst is produced in-situ via reaction of a metal compound, an acid, and a phosphine according to the equation:

to form the hydroesterification catalyst active to produce the polyketoester; wherein M is Ni or Pd; each L is independently, a leaving group ligand comprising a hydrocarbyl, a substituted hydrocarbyl, a functional group comprising elements from Group 13-17 of the periodic table of the elements, or a combination thereof, or each of the two ligands L join together to form a single divalent $C_4$ to $C_{62}$ cyclic or polycyclic ring structure; A⁻ is the conjugate base of acid HA, and $P_dX_eY_f$ is a phosphine ligand system comprising one or more phosphine moieties, each independently substituted with a combination of monovalent ligands X and divalent ligands Y; each monovalent ligand X is independently a hydrocarbyl, a substituted hydrocarbyl, and/or a functional group comprising elements from Group 13-17 of the periodic table of the elements; each divalent ligand Y is independently a hydrocarbyl, a substituted hydrocarbyl, and/or a functional group comprising elements from Group 13-17 of the periodic table of the elements; d≥1; and e+2*f=3*d.

In some embodiments, the olefin-CO copolymerization catalyst and the hydroesterification catalyst are the same.

In one or more embodiments, the olefin-CO copolymerization catalyst is a P—SO$_3$ bidentate Drent-type catalyst having the general formula:

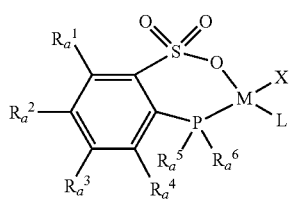

wherein M is a Group 8, 9, or 10 metal; each of $R_a^1$, $R_a^2$, $R_a^3$, $R_a^4$, $R_a^5$, and $R_a^6$, is, independently, a hydrogen, a $C_1$-$C_{20}$ hydrocarbyl radical, a $C_1$-$C_{20}$ substituted hydrocarbyl radical, and/or a functional group comprising elements from Group 13-17 of the periodic table of the elements; or two or more of $R_a^1$, $R_a^2$, $R_a^3$, and $R_a^4$, and/or both of $R_a^5$, and $R_a^6$ join together to form a $C_4$ to $C_{62}$ cyclic or polycyclic ring structure; wherein X is a monovalent functional group comprising elements from Group 13-17 of the periodic table of the elements; and wherein L is Lewis base. In some of such embodiments, M is Pd; $R_a^3$ is methyl; and $R_a^5$ and $R_a^6$ are aromatic moieties, preferably phenyl. In other of such embodiments, M is Pd and $R_a^5$ and $R_a^6$ are ortho-anisolyl.

In one or more embodiments, the hydroesterification catalyst comprises a Group 8, 9, or 10 metal, preferably Pd, coordinated with: a diphosphine having the general formula:

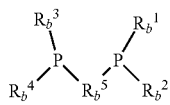

wherein each of $R_b^1$, $R_b^2$, $R_b^5$, and $R_b^4$, is, independently, a hydrogen, a $C_1$-$C_{20}$ hydrocarbyl radical, a $C_1$-$C_{20}$ substituted hydrocarbyl radical, and/or a functional group comprising elements from Group 13-17 of the periodic table of the elements; or two or more of $R_b^1$, $R_b^2$, $R_b^5$, and $R_b^4$ join together to form a $C_4$ to $C_{62}$ cyclic or polycyclic ring structure; and $R_b^5$ is a divalent $C_1$-$C_{20}$ hydrocarbyl radical, a divalent $C_1$-$C_{20}$ substituted hydrocarbyl radical, and/or a divalent functional group comprising elements from Group 13-17 of the periodic table of the elements.

In particular embodiments of the invention, the hydroesterification catalyst comprises a Group 8, 9, or 10 metal, preferably Pd, coordinated with:
1,3-bis(diphenylphosphino)propane (dppp);
1,3-bis[bis(o-tolyl)phosphoryl]propane (dtpp)
1,3-bis[bis(mesityl)phosphoryl]propane (dmpp)
1,3-bis((2-methoxyphenyl)(phenyl)phosphanyl)propane
1,1'-bis(diphenylphosphino)ferrocene (dppf);
1,2-bis(diphenylphosphino)benzene (dppb);
bis(dicyclohexylphosphino)ethane;
1,2-bis(diisopropylphosphino)ethane;
1,2-bis(dimethylphosphino)ethane;
1,4-bis(diphenylphosphino)butane;
1,2-bis(diphenylphosphino)ethane;
bis(diphenylphosphino)methane;
triphenyl phosphine;
2,2'-bis(diphenylphosphino)-1,1'-binaphthyl);
4,4'-Bi-1,3-benzodioxole-5,5'-diylbis(diphenylphosphane);
4,4'-Bi-1,3-benzodioxole-5,5'-diylbis(di-2,4-dimethyl-phenylphosphane);
4,4'-Bi-1,3-benzodioxole-5,5'-diylbis(di-2,4-di(t-butyl)-3-methoxy-phenylphosphane);
4,5-Bis(diphenylphosphino)-9,9-dimethylxanthene;
2-Dicyclohexylphosphino-2',4',6'-triisopropylbiphenyl;
2-Dicyclohexylphosphino-2',6'-dimethoxybiphenyl;
2-(2-dicyclohexylphosphanylphenyl)-N1,N1,N3,N3-tetramethyl-benzene-1,3-diamine;
a dialkylbiaryl phosphine;
ethane-1,2-diylbis[(2-methoxyphenyl)phenylphosphane];
O-isopropylidene-2,3-dihydroxy-1,4-bis(diphenylphosphino)butane;
1,5-diaza-3,7-diphosphacyclooctane;
(oxydi-2,1-phenylene)bis(diphenylphosphine);
(2RS,3RS)-(−)-bis(diphenylphosphino)butane;
1,2-Bis[(2S,5S)-2,5-di-($C_1$-$C_{20}$ hydrocarbyl) phospholano]benzene;
or a combination thereof.

In one or more of such embodiments, the hydroesterification catalyst comprises a Group 8, 9, or 10 metal, preferably Pd, coordinated with one or more of ligands generally represented as unsubstituted ligands (I) through (X) in the table below, each of which may be further substituted with a $C_1$-$C_{20}$ hydrocarbyl radical, a $C_1$-$C_{20}$ substituted hydrocarbyl radical, and/or a functional group comprising elements from Group 13-17 of the periodic table of the elements:

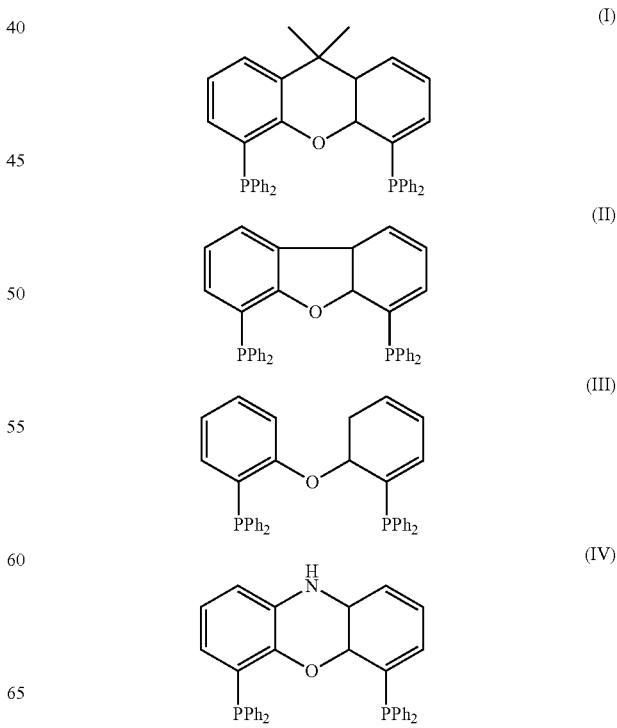

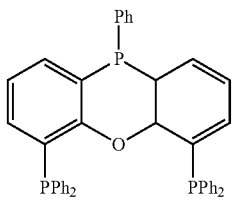 (V)

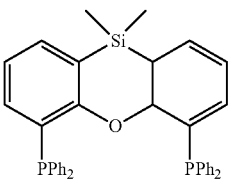 (VI)

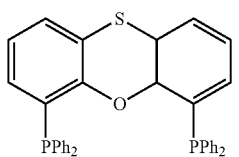 (VII)

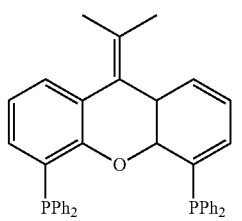 (VIII)

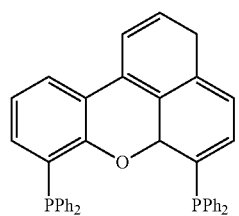 (IX)

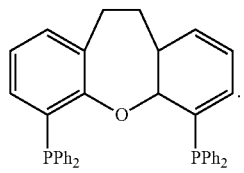 (X)

In one or more embodiments of the process, the reaction temperature is greater than or equal to about 50° C.; and/or a CO partial pressure in the reactor is greater than or equal to about 5 Bar, or greater than or equal to about 10 Bar; and/or each catalyst is present in the reaction medium at greater than or equal to about 0.5 mol %, based on the total amount of the reaction medium present; and/or the period of time is greater than or equal to about 1 minute.

In one or more embodiments, the solvent is a halogenated hydrocarbon comprising from 1 to 10 carbon atoms, a halogenated aromatic hydrocarbon comprising from 1 to 20 carbon atoms, or a combination thereof. In particular embodiments, the solvent is a tetrahaloethane, preferably tetrachloroethane; and/or a dihaloaromatic comprising 6 or more carbon atoms, preferably dichlorobenzene and/or dichlorotoluene and/or dibromobenzene and/or dibromotoluene.

In some embodiments, the molar ratio of alpha olefin (when present) to alpha-omega enol in the reaction medium is from about 1:99 to 99:1. In one or more embodiments, the polyketoester comprises long chain branching having 7 carbon atoms or more, present at greater than or equal to about 5 long chain branches per 1000 carbon atoms.

In other embodiments, the olefinic polyketoester (when present) comprises long chain branching having 7 carbon atoms or more, present at greater than or equal to about 5 long chain branches per 1000 carbon atoms.

Embodiments of the invention further include the polyketoester produced according to any one or combination of embodiments of the process. In some embodiments, a polyketoester has an empirical formula:

$$(A)_a(B)_b(C)_c(D)_d$$

wherein:
a>0, b≥0, c>0, and d≥0;
a+b+c+d>100;
moieties A, B, C, and D may be arranged randomly, in blocks, or in any order;
moiety A has the general formula:

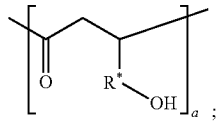

moiety B having the general formula:

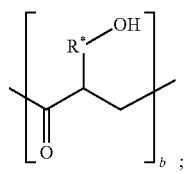

moiety C having the general formula:

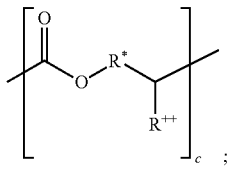

and
moiety D having the general formula:

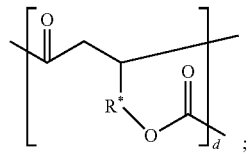

and
wherein $R^{++}$ is H, or a polyketoester chain having the empirical formula $(A)_a(B)_b(C)_c(D)_d$;

wherein a>0, b≥0, c>0, and d≥0. In some embodiments, the polyketoester comprises long chain branching having 7 carbon atoms or more, present at greater than or equal to about 5 long chain branches per 1000 carbon atoms.

Other embodiments of the invention include the olefin-polyketoester produced according to any one or combination of embodiments of the process which include an alpha olefin. In some embodiments, an olefinic-polyketoester has an empirical formula:

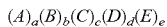

wherein:
a>0, b≥0, c>0, d≥0, and e>0;
a+b+c+d+e>100;
moieties A, B, C, D and E may be arranged randomly, in blocks, or in any order;
moiety A has the general formula:

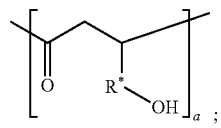

moiety B having the general formula:

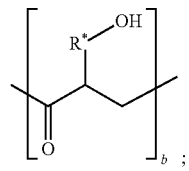

moiety C having the general formula:

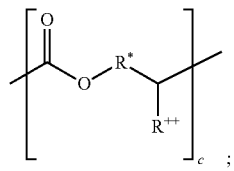

moiety D having the general formula:

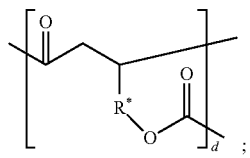

moiety E having the general formula:

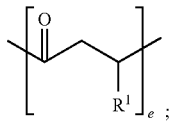

$R^1$ is H or a hydrocarbyl comprising 1 to 18 carbon atoms; and $R^{++}$ is H, or a polyketoester chain having the empirical formula:

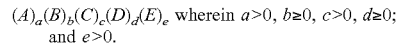

In some embodiments, the olefinic-polyketoester comprises long-chain branching having 7 carbon atoms or more, present at greater than or equal to about 5 long-chain branches per 1000 carbon atoms.

In one or more embodiments, unless otherwise noted, any R group or radical which is, or which is substituted with a functional group comprising elements from Group 13-17 of the periodic table of the elements, comprises at least one hydrogen atom that has been replaced with a linear, branched and/or aromatic hydrocarbon radical comprising from 1 to 20 carbon atoms, Br, Cl, F, I, —NR*$_2$, —CONR*$_2$, —NR*—CO—R*, —OR*, *—O—CO—R*, —CO—O—R*, —SeR*, —TeR*, —PR*$_2$, —PO—(OR*)$_2$, —O—PO—(OR*)$_2$, —AsR*2, —SbR*2, —SR*, *, —SO$_a$R$_b$*(a=2 or 3, b=1 or 2), —SO$_2$—(OR*)$_2$, —BR*$_2$, —SiR*$_3$, —GeR*$_3$, —SnR*$_3$, —PbR*$_3$, —(CH$_2$)$_q$—SiR*$_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

In embodiments, one of the monomers present is a chain transfer agent comprising a terminal carbon-carbon double bond and an alcohol, preferably an alpha-omega enol. Examples include vinyl benzyl alcohol (VBA) polymerizations, in which the monomer functions as an olefin/CO copolymerization monomer and is capable of undergoing hydroesterification, i.e., a hydroesterification chain transfer agent. In other embodiments, an alpha olefin is present as a monomer, e.g., 1-hexene/CO copolymerization, where ultimately an α,ω-enol is employed as both a monomer and as a chain transfer agent.

In embodiments, the process comprises a tandem catalysis system wherein two different catalysts are employed in a single reactor or reaction medium (e.g., one-pot) in which an olefin-CO copolymerization catalyst, e.g., a Drent-type P,O ligand, and hydroesterification catalyst, e.g., a group 8, 9 or 10 metal coordinated with a phenyl phosphine e.g., PPh$_3$. Likewise, in other embodiments, a single catalyst is employed which is capable of functioning both as an olefin-CO copolymerization catalyst and a hydroesterification catalyst, e.g., a group 8, 9 or 10 metal coordinated with a bis-phosphine. It has been discovered that varying steric and electronic properties of the catalyst ligand may be used to fine tune the reaction rates of polymer formation via a combination of olefin-CO copolymerization and hydroesterification.

Olefin-CO copolymerization and hydroesterification are typically run in different solvents which are mutually exclusive. For example, styrene-CO copolymerization with N—N ligands such as bipyridine and phenanthroline performs very well only in protic solvents like methanol. In contrast, this inventor's previously-developed styrene hydroesterification do not work in such solvents. Hydroesterification is essentially inactive in protic solvents. For example, Drent-type P,O ligands are inactive in protic solvents but are compatible with arene and halogenated solvents when used for hydroesterification.

Applicant discovered that solvents may be selected which allow for both olefin-CO copolymerization and hydroesterification. In some embodiments, the solvent is selected such that both olefin-CO copolymerization formation and hydroesterification occur at similar rates. Suitable solvents include halogenated hydrocarbons such as methylene chloride, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, 1,1-dichloroethylene, 1,2-dichloroethylene, with 1,1,2,2-tetrachloroethane being more preferred. Likewise, the brominated, iodated, and/or fluorinated analogues and/or analogues comprising two of more halo substitutions e.g., chloro-bromo-iodo- and/or fluorinated hydrocarbons are also suitable, e.g., 1,1,2-trichloro-1,2,2-trifluoroethane.

In embodiments, the solvent comprises a halogenated hydrocarbon according to the general formula:

wherein, $a+b+c+d+e+f+g+h+i+j=6$; and $b+c+d+e+g+h+i+j \geq 1$, preferably $b+c+d+e+g+h+i+j \geq 2$.

In an embodiment, the solvent may comprise one or more halogenated aromatic $C_1$-$C_{10}$ hydrocarbons comprising one or more halogen substitutions. Examples include a halobenzene e.g., fluorobenzene, chlorobenzene, a halo-toluene, e.g., chlorotoluene, a dihalobenzene, e.g., dichlorobenzene, dibromobenzene, and/or the like, aromatic hydrocarbons substituted with two or more different halogens, e.g., chloro-bromo-benzene, and/or the like.

In one or more embodiments, the solvent comprises a linear or cyclic saturated or unsaturated hydrocarbons having 1 to 15 carbon atoms. Examples include isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™ fluids); per-halogenated hydrocarbons, such as perfluorinated $C_{4-10}$ alkanes, chlorobenzene, and aromatic and alkyl substituted aromatic compounds, such as benzene, toluene, mesitylene, and xylene. In embodiments, the solvents includes a liquid olefin which may act as a monomer or comonomer including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

In embodiments, the solvent includes an aliphatic or cyclic saturated or unsaturated alcohol having 1 to 17 carbon atoms. Suitable examples include methanol, ethanol, n-propyl alcohol, isopropyl alcohol, n-butyl alcohol, secondary butyl alcohol, isobutyl alcohol, tertiary Butyl alcohol, pentyl alcohol, secondary amyl alcohol, 1-ethyl-1-propanol, 2-methyl-1-butanol, isopentyl alcohol, tertiary pentyl alcohol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, 1-decanol, 1-undecanol, 1-dodecanol, allyl alcohol, propargyl Alcohol, benzyl alcohol, cyclohexanol, 1-methylcyclohexanol, 2-methylcyclohexanol, 3-methylcyclohexanol, 4-methylcyclohexanol, α-terpineol, avietinol, 2,6-dimethyl Selected from the group consisting of –4-heptanol, trimethyl nonyl alcohol, tetradecyl alcohol and heptadecyl alcohol. More preferred are methanol, ethanol and isopropyl alcohol.

In embodiments, the solvent comprises a ketone having the general formula R—CO—R' and/or R—CO—R'—CO—R", wherein R, R' and R" are each saturated or unsaturated hydrocarbon groups having from 1 to 9 carbon atoms. Suitable examples include acetone, methyl ethyl ketone, 2-pentanone, 3-Pentanone, 2-hexanone, methyl-n-butyl ketone, methyl butyl ketone, 2-heptanone, 4-heptanone, diisobutyl ketone, acetonitrile, acetone, mesityl oxide, photon, methyl-n-Amyl ketone, ethyl butyl ketone, methyl hexyl ketone, cyclohexanone, methyl cyclohexanone, isophorone, 2,4-pentanedione, diacetone alcohol, acetophenone and fenchon.

In embodiments, the solvent comprises an aromatic compound, e.g., benzene or a benzene derivative such as toluene, xylene, ethylbenzene, isopropylbenzene, diethylbenzene, secondary butylbenzene, triethylbenzene, diisopropylbenzene, styrene, alkylbenzene sulfonic acid group e.g., phenol, mesitylene, naphthalene, tetralin, butylbenzene, p-simmene, cyclohexylbenzene, pentylbenzene, dipentylbenzene, dodecylbenzene, biphenyl o-cresol, m-cresol and/or xylenol.

In embodiments, the solvent comprises an ester having from 1 to 20 carbon atoms. Suitable examples include methyl formate, ethyl formate, propyl formate, butyl formate, isobutyl formate, pentyl formate, methyl acetate, ethyl acetate, propyl acetate, isopropyl acetate, butyl acetate, isobutyl acetate, secondary butyl acetate, Pentyl acetate, isopentyl acetate, 3-methoxybutyl acetate, secondary hexyl acetate, 2-ethyl butyl acetate, 2-ethyl hexyl acetate, cyclohexyl acetate, benzyl acetate, methyl propionate, ethyl propionate, butyl prop cypionate, isopentyl propionate, methyl butyrate, ethyl butyrate, butyl butyrate, isobutyl isobutyrate, ethyl 2-hydroxy-2-methyl propionate, butyl stearate, methyl benzoate, ethyl benzoate, propyl benzo Eight, wealth Benzoate, isopentyl benzoate, benzyl benzoate, ethyl abietate, benzyl abietate, bis-2-ethyl hexyl adipate r-butyro matone, diethyl oxalate, dibutyl oxalate, dipentyl oxalate, Diethyl malonate, dimethyl malate, dimethyl malate, dibutyl malate, dibutyl tertarate, tributyl citrate, dibutyl sebacate, bis-2-ethylhexyl sebacate, dimethyl phthalate, diethyl phthalate, Dibutyl phthalate, bis-2-ethylhexyl phthalate and/or dioctyl phthalate.

In one or more embodiments, the copolymer includes units derived from ethylene alone, one or more α-olefins having three carbons alone, e.g., propylene, hexene, octene, or a combination of two or more alpha olefins, e.g., ethylene and propylene, along with one or more alpha-omega enols via polyester linkages. Preferably the alpha olefin has from 2 carbons to 12 carbons.

In some embodiments, the copolymer includes from about 0.1 wt % to about 99 wt % of the alpha-omega enols, preferably at least about 0.5 wt %, or at least about 1 wt %, or 2 wt %, or 3 wt %, or 4 wt %, or 5 wt %, or 10 wt %, or 15 wt %, or 20 wt % and less than about 45 wt %, or less than 40 wt % or 30 wt % of units derived from one or more alpha-omega enols.

In one or more embodiments, the copolymer comprise from about 1 wt % to about 99.9 wt % of one or more alpha olefins. Preferably, the copolymer comprises at least 20 wt %, or 30 wt % or 40 wt % or 50 wt %, or 60 wt %, or 70 wt %, or 80 wt % of units derived from one or more alpha-olefins, preferably ethylene, based on the weight of the copolymer. In other embodiments, the copolymer can include from about 5 to about 95 wt %, from about 25 wt % to about 95 wt %, from about 50 wt % to about 95 wt %, from about 5 wt % to about 75 wt %, from about 25 wt % to about 75 wt from about 50 to about 75 wt %, from about 60 wt % to about 75 wt %, or from about 65 wt % to about 75 wt % of units derived from ethylene based on the weight of the copolymer.

In some embodiments, the copolymer can include at least 10 wt %, at least 20 wt %, at least 30 wt %, or at least 40 wt %, at least 50 wt %, at least 55 wt %, at least 60 wt %, at least 65 wt %, or at least 70 wt % of units derived from a $C_{3+}$ alpha-olefin based on the weight of the copolymer. In some embodiments, the copolymer can include from about 5 wt % to about 95 wt %, from about 25 wt % to about 95 wt %, from about 50 wt % to about 95 wt %, from about 5 wt % to about 75 wt %, from about 25 to about 75 wt % from about 50 wt % to about 75 wt %, from about 60 wt % to about 75 wt %, or from about 65 wt % to about 75 wt % of units derived from a $C_{3+}$ α-olefin based on the weight of the copolymer. In some embodiments, the units derived from the $C_{3+}$ α-olefin can be derived from $C_3$-$C_{20}$ α-olefins, including combinations of one or more $C_3$-$C_{20}$ α-olefins. In some embodiments, the units derived from the $C_{3+}$ α-olefin can be derived from propylene, 1-butene, isobutylene, 2-butene, cyclobutene, 1-pentene, 1-hexene, 4-methyl-1-pentene, 1-octene, 3-methyl-1-butene, 4-methyl-1-butene, cyclopentene, 1-hexene, cyclohexene, 1-octene, 1-decene, 1-dodecene, or combinations thereof. In some embodiments, the units derived from an α-olefin can be derived from propylene. In some embodiments, the molar ratio of ethylene units to the α-olefin units is about 5/95 to about 95/5, about 40/60 to about 95/5, about 50/50 to about 95/5, or about 60/40 to about 95/5.

In embodiments, the polyketoester has an empirical formula:

$(A)_a(B)_b(C)_c(D)_d$ wherein a>0, b≥0, c>0, and d≥0;
moieties A, B, C, and D may be arranged randomly, in blocks, or in any order;
moiety A having the general formula:

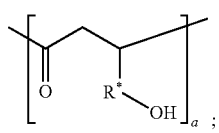

moiety B having the general formula:

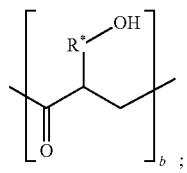

moiety C having the general formula:

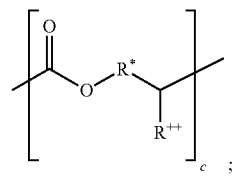

and
moiety D having the general formula:

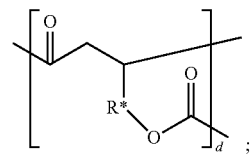

wherein $R^{++}$ is H, or a polyketoester chain having the empirical formula $(A)_a$ $(B)_b$ $(C)_c$ $(D)_d$;
wherein a>0, b≥0, c>0, and d≥0.

In one embodiment, the polyketoester is a random copolymer. In other embodiments the polyketoester is a block copolymer and/or a pseudo-random copolymer.

As indicated above, moiety D results in branching via incorporation of the olefin portion of the alpha-omega enol via olefin-CO copolymerization followed by hydroesterification of the alcohol portion of the alpha-omega enol. In embodiments, the branched chain may be another polymeric chain resulting in long-chain branching of the polymer, which may further include multiple long-chain branches.

In embodiments, the alpha-omega enol has the general formula:

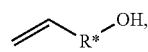

wherein R* is a divalent hydrocarbyl, a divalent hydrocarbyl substituted with one or more functional group comprising elements from Group 13-17 of the periodic table of the elements, or a combination thereof. Preferred functional groups include linear or branched $C_1$ to $C_{20}$ aliphatic hydrocarbons, alicyclic hydrocarbons, aromatic hydrocarbons, and/or substituted hydrocarbons wherein at least one carbon atom has been replaced by Group 13-16 element, preferably by boron, silicon, germanium, oxygen, nitrogen, phosphorous, and/or sulfur, and/or wherein a hydrogen atom of the hydrocarbon has been replaced with a linear, branched and/or aromatic hydrocarbon radical comprising from 1 to 20 carbon atoms, Br, Cl, F, I, —$NR^*_2$, —$CONR^*_2$, —$NR^*$—CO—$R^*$, —$OR^*$, *—O—CO—$R^*$, —CO—O—

R*, —SeR*, —TeR*, —PR*$_2$, —PO—(OR*)$_2$, —O—PO—(OR*)$_2$, —AsR*2, —SbR*2, —SR*, *, —SO$_a$R$_b$*(a=2 or 3, b=1 or 2), —SO$_2$—(OR*)$_2$, —BR*$_2$, —SiR*$_3$, —GeR*$_3$, —SnR*$_3$, —PbR*$_3$, —(CH$_2$)$_q$—SiR*$_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

Preferred alpha-omega enols include linear C$_4$-C$_{12}$ enols having the general formula:

wherein m is from 1 to 18, preferably from 4 to 6, preferably but-1-ene-4-ol, pent-1-ene-5-ol, hex-1-ene-6-ol, hept-1-ene-7-ol, oct-1-ene-8-ol, or a combination thereof.

In other embodiments, the alpha-omega enols include aromatic enols having the general formula:

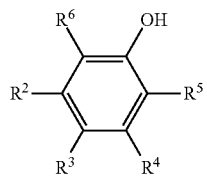

wherein each of $R^2$, $R^3$, $R^4$, $R^5$ and $R^6$ is, independently, a hydrogen, a C$_1$-C$_{20}$ hydrocarbyl radical, a functional group comprising elements from Group 13-17 of the periodic table of the elements, or a combination thereof, or wherein two or more of $R^2$, $R^3$, $R^4$, $R^5$ and $R^6$ independently join together to form a C$_4$ to C$_{62}$ cyclic or polycyclic ring structure subject to the proviso that at least one of $R^2$, $R^3$, $R^4$, $R^5$ and $R^6$ comprise a moiety having a terminal carbon-carbon double bond.

In still other embodiments, the alpha-omega enols include aromatic enols having the general formula:

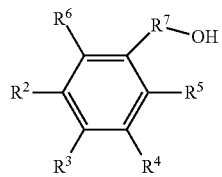

wherein each of $R^2$, $R^3$, $R^4$, $R^5$ and $R^6$ is, independently, a hydrogen, a C$_1$-C$_{20}$ hydrocarbyl radical, a functional group comprising elements from Group 13-17 of the periodic table of the elements, or a combination thereof, or wherein two or more of $R^2$, $R^3$, $R^4$, $R^5$ and $R^6$ independently join together to form a C$_4$ to C$_{62}$ cyclic or polycyclic ring structure; and $R^7$ is a divalent C$_1$-C$_{20}$ hydrocarbyl radical, a divalent functional group comprising elements from Group 13-17 of the periodic table of the elements, subject to the proviso that at least one of $R^2$, $R^3$, $R^4$, $R^5$ and $R^6$ comprises a moiety having a terminal carbon-carbon double bond.

Preferred aromatic alpha-omega enols include benzylic vinyl alcohols e.g., vinyl benzalcohol, dichlorovinyl benzalcohol, and/or the like.

Polymerization Process

In embodiments herein, the invention relates to polymerization processes comprising contacting an alpha-omega enol having the general formula:

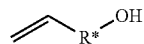

wherein R* is a divalent hydrocarbyl, a divalent hydrocarbyl substituted with one or more functional group comprising elements from Group 13-17 of the periodic table of the elements, or a combination thereof; and carbon monoxide (CO) in the presence of a hydroesterification catalyst and an olefin-CO copolymerization catalyst in a reaction medium within a reactor at a temperature, a CO pressure, and for a period of time sufficient to produce a polyketoester.

In other embodiments, the process comprises contacting the alpha-omega enol and carbon monoxide with an alpha olefin having the general formula:

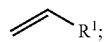

wherein $R^1$ is H or a hydrocarbyl comprising 1 to 18 carbon atoms in the presence of a hydroesterification catalyst and an olefin-CO copolymerization catalyst in a reaction medium within a reactor at a temperature, a CO pressure, and for a period of time sufficient to produce an olefin-polyketoester.

The polymerization processes of this invention can be carried out in any manner known in the art. Any suspension, homogeneous, bulk, solution, and/or slurry polymerization process known in the art can be used. Such processes can be run in a batch, semi-batch, or continuous mode. Homogeneous polymerization processes and slurry processes are preferred. (A homogeneous polymerization process is preferably a process where at least 90 wt % of the product is soluble in the reaction media.) A bulk homogeneous process is particularly preferred. (A bulk process is preferably a process where monomer concentration in all feeds to the reactor is 70 volume % or more.) In another embodiment, the process is a slurry process. As used herein the term "slurry polymerization process" wherein the polymerization process utilizes a catalyst having such limited solubility in the system that the solvent is saturated with the catalyst and is present in the reaction medium as a slurry. In other embodiments, a supported catalyst is employed and monomers are polymerized on the supported catalyst particles. In embodiments, the polymerizations can be run at any temperature and/or pressure suitable to obtain the desired polyketoester or olefin-polyketoester polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 50° C. to about 80° C.; and at a total pressure in the range of from about 0.35 MPa to about 10 MPa, preferably from about 0.45 MPa to about 6 MPa, or preferably from about 0.5 MPa to about 4 MPa.

In embodiments, the polymerizations can be run at a CO partial pressure in the reactor of greater than or equal to about 5 Bar, or greater than or equal to about 10 Bar.

In embodiments, each catalyst is present in the reaction medium at greater than or equal to about 0.5 mol %, based on the total amount of the reaction medium present.

In embodiments, the reaction time is greater than or equal to about 1 minute, preferably less than 24 hours.

In a typical polymerization, the run time of the reaction is up to 300 minutes, preferably in the range of from about 5 to 250 minutes, or preferably from about 10 to 120 minutes.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In embodiments, the polymerization occurs in one reaction zone. In alternative embodiments, two or more reaction zones are utilized.

In an embodiment, two separate catalyst systems are utilized in the polymerization. In a preferred embodiment, a single catalyst capable of both olefin-CO polymerization and hydroesterification is employed within the reaction medium. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Other additives may also be used in the polymerization, as desired, such as one or more scavengers, promoters, modifiers, reducing agents, oxidizing agents, hydrogen, and/or the like.

The polymerization can be carried out as a batchwise polymerization or as a continuous polymerization where the components are continuously supplied to the reaction zone.

The reactor temperature and pressure can be controlled via reflux of vaporizing monomers (autorefrigeration), and/or via cooling coils, jackets and the like. The polymerization rate can be controlled by the rate of catalyst addition. The ethylene and/or CO content and/or alpha-omega ene-ol of the inventive copolymer can be determined by the ratio of components in the reactor, which can be controlled by manipulating the respective feed rates of these components to the reactor. The molecular weight of the inventive copolymer can be controlled, optionally, by controlling other polymerization variables such as the temperature, or by a stream of hydrogen introduced to the gas or liquid phase of the reactor, as is well known in the art. The inventive copolymer which leaves the reactor can be recovered by flashing off gaseous monomers at reduced pressure, and, if necessary, conducting further devolatilization to remove residual monomers in equipment such as a devolatilizing extruder. In a continuous process, the mean residence time of the catalyst and polymer in the reactor generally can be from about 1 minute to 8 hours, 30 minutes to 6 hours, or 1 to 4 hours.

Embodiments Listing

Accordingly, the instant disclosure is directed to the following embodiments:

E1. A polymerization process comprising:
contacting an alpha-omega enol having the general formula:

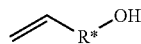

wherein R* is a divalent hydrocarbyl, a divalent hydrocarbyl substituted with one or more functional group comprising elements from Group 13-17 of the periodic table of the elements, or a combination thereof; and carbon monoxide (CO) in the presence of a hydroesterification catalyst and an olefin-CO copolymerization catalyst in a reaction medium within a reactor at a temperature, a CO pressure, and for a period of time sufficient to produce a polyketoester having an empirical formula:

$$(A)_a(B)_b(C)_c(D)_d$$

wherein a>0, b≥0, c>0, and d≥0;
moieties A, B, C, and D may be arranged randomly, in blocks, or in any order;
moiety A having the general formula:

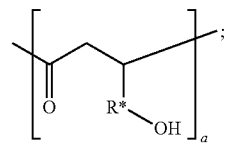

moiety B having the general formula:

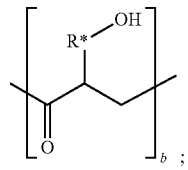

moiety C having the general formula:

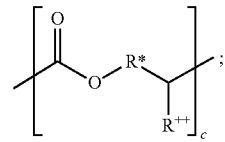

and
moiety D having the general formula:

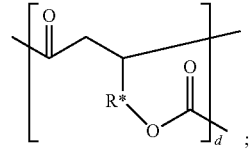

wherein $R^{++}$ is H, or a polyketoester chain having the empirical formula $(A)_a$ $(B)_b$ $(C)_c$ $(D)_d$; wherein a>0, b≥0, c>0, and d≥0.

E2. A polymerization process comprising:
contacting an alpha-omega enol having the general formula:

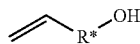

wherein R* is a divalent hydrocarbyl, a divalent hydrocarbyl substituted with one or more functional group comprising elements from Group 13-17 of the periodic table of the elements, or a combination thereof;

an alpha olefin having the general formula:

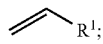

wherein $R^1$ is H or a hydrocarbyl comprising 1 to 18 carbon atoms;

and carbon monoxide (CO) in the presence of a hydroesterification catalyst and an olefin-CO copolymerization catalyst in a reaction medium within a reactor at a temperature, a CO pressure, and for a period of time sufficient to produce an olefin-polyketoester or a branched olefin-polyketoester having an empirical formula:

$(A)_a(B)_b(C)_c(D)_d(E)_e$ wherein $a>0$, $b\geq 0$, $c>0$, $d\geq 0$; and $e>0$;

moieties A, B, C, D, and E may be arranged randomly, in blocks, or in any order;

moiety A having the general formula:

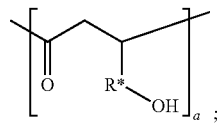

moiety B having the general formula:

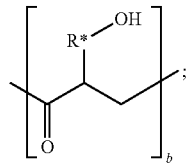

moiety C having the general formula:

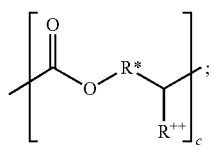

and
moiety D having the general formula:

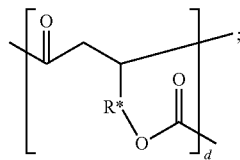

moiety E having the general formula:

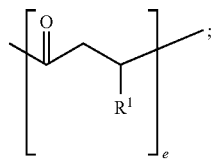

and
wherein $R^{++}$ is H, or an olefin-polyketoester chain having the empirical formula $(A)_a$ $(B)_b$ $(C)_c$ $(D)_d$ $(E)_e$; wherein $a>0$, $b\geq 0$, $c>0$, $d\geq 0$; and $e>0$.

E3. The process of embodiment E1 or E2, wherein R* is a linear or branched divalent alkane radical having 1 to 19 carbon atoms.

E4. The process of any one of embodiments E1 through E3, wherein the R* comprises at least one divalent aromatic ring system.

E5. The process of any one of embodiments E1 through E4, wherein the alpha-omega enol is according to the formula:

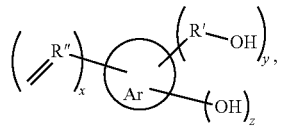

wherein Ar represents a cyclic or aromatic ring system;

each R', when present, is a divalent hydrocarbyl, a divalent hydrocarbyl substituted with one or more functional group comprising elements from Group 13-17 of the periodic table of the elements, or a combination thereof;

wherein each R" is a divalent hydrocarbyl, a divalent hydrocarbyl substituted with one or more functional groups comprising elements from Group 13-17 of the periodic table of the elements, or a combination thereof;

$x \geq 1$; and
$y+z \geq 1$.

E6. The process of any one of embodiments E1 through E5, wherein the alpha-omega enol is according to the formula:

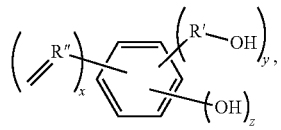

wherein each R', when present, is a divalent hydrocarbyl, a divalent hydrocarbyl substituted with one or more functional group comprising elements from Group 13-17 of the periodic table of the elements, or a combination thereof;

wherein each R" is a divalent hydrocarbyl, a divalent hydrocarbyl substituted with one or more functional groups comprising elements from Group 13-17 of the periodic table of the elements, or a combination thereof;

$x \geq 1$; and
$y+z \geq 1$.

E7. The process of any one of embodiments E1 through E6, wherein the alpha-omega enol is according to the formula:

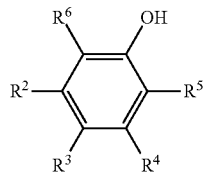

wherein each of $R^2$, $R^3$, $R^4$, $R^5$ and $R^6$ is, independently, a hydrogen, a $C_1$-$C_{20}$ hydrocarbyl radical, a functional group comprising elements from Group 13-17 of the periodic table of the elements, or a combination thereof, or wherein two or more of $R^2$, $R^3$, $R^4$, $R^5$ and $R^6$ independently join together to form a $C_4$ to $C_{62}$ cyclic or polycyclic ring structure subject to the proviso that at least one of $R^2$, $R^3$, $R^4$, $R^5$ and $R^6$ comprise a moiety having a terminal carbon-carbon double bond.

E8. The process of any one of embodiments E1 through E7, wherein the alpha-omega enol is according to the formula:

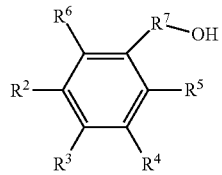

wherein x is from 1 to 20;
each of $R^2$, $R^3$, $R^4$, $R^5$ and $R^6$ is, independently, a hydrogen, a $C_1$-$C_{20}$ hydrocarbyl radical, a functional group comprising elements from Group 13-17 of the periodic table of the elements, or a combination thereof, or wherein two or more of $R^2$, $R^3$, $R^4$, $R^5$ and $R^6$ independently join together to form a $C_4$ to $C_{62}$ cyclic or polycyclic ring structure;
$R^7$ is a divalent $C_1$-$C_{20}$ hydrocarbyl radical, a divalent functional group comprising elements from Group 13-17 of the periodic table of the elements, subject to the proviso that at least one of $R^2$, $R^3$, $R^4$, $R^5$ and $R^6$ comprises a moiety having a terminal carbon-carbon double bond.

E9. The process of any one of embodiments E1 through E8, wherein the olefin-CO copolymerization catalyst, the hydroesterification catalyst, or both comprise a metal from Groups 8, 9, or 10 of the periodic table of elements.

E10 The process of any one of embodiments E1 through E9, wherein each of the olefin-CO copolymerization catalyst, the hydroesterification catalyst, or both independently comprise Ni or Pd.

E11. The process of any one of embodiments E1 through E10, wherein the hydroesterification catalyst is produced in-situ via reaction of $M(L)_2+HA+P_dX_eY_f$ to form the hydroesterification catalyst active to produce the copolymer;
wherein M is Ni or Pd;
each L is independently a ligand comprising a hydrocarbyl, a substituted hydrocarbyl, a functional group comprising elements from Group 13-17 of the periodic table of the elements, or a combination thereof, or each of the two ligands L join together to form a single divalent $C_4$ to $C_{62}$ cyclic or polycyclic ring structure;
$A^-$ is the conjugate base of an acid;
$P_dX_eY_f$ is a phosphine ligand system comprising one or more phosphine moieties, each independently substituted with a combination of monovalent ligands X and divalent ligands Y;
each monovalent ligand X is independently a hydrocarbyl, a substituted hydrocarbyl, and/or a functional group comprising elements from Group 13-17 of the periodic table of the elements;
each divalent ligand Y is independently a hydrocarbyl, a substituted hydrocarbyl, and/or a functional group comprising elements from Group 13-17 of the periodic table of the elements;
$d \geq 1$; and
$e+2*f=3*d$.

E12. The process of any one of embodiments E1 through E11, wherein the olefin-CO copolymerization catalyst and the hydroesterification catalyst are the same.

E13. The process of any one of embodiments E1 through E12, wherein the olefin-CO copolymerization catalyst is a P—$SO_3$ bidentate Drent-type catalyst having the general formula:

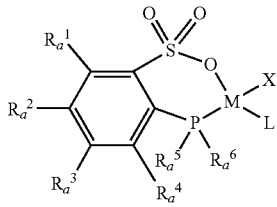

wherein M is a Group 8, 9, or 10 metal;
each of $R_a^1$, $R_a^2$, $R_a^3$, $R_a^4$, $R_a^5$, and RP, is, independently, a hydrogen, a $C_1$-$C_{20}$ hydrocarbyl radical, a $C_1$-$C_{20}$ substituted hydrocarbyl radical, and/or a functional group comprising elements from Group 13-17 of the periodic table of the elements; or two or more of $R_a^1$, $R_a^2$, $R_a^3$, and $R_a^4$, and/or both of $R_a^5$, and RP join together to form a $C_4$ to $C_{62}$ cyclic or polycyclic ring structure;
wherein X is a monovalent functional group comprising elements from Group 13-17 of the periodic table of the elements; and wherein L is Lewis base.

E14. The process of embodiment E13, wherein M is Pd; $R_a^3$, is methyl; and
$R_a^5$ and $R_a^6$ are phenyl.

E15. The process of embodiment E13, wherein M is Pd; and
$R_a^5$ and $R_a^6$ are ortho-anisolyl.

E16. The process of any one of embodiments E1 through E15, wherein the hydroesterification catalyst comprises a Group 8, 9, or 10 metal, preferably Pd, coordinated with:
a diphosphine having the general formula:

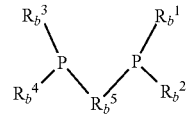

wherein each of $R_b^1$, $R_b^2$, $R_b^5$, and $R_b^4$, is, independently, a hydrogen, a $C_1$-$C_{20}$ hydrocarbyl radical, a $C_1$-$C_{20}$ substituted hydrocarbyl radical, and/or a functional group comprising elements from Group 13-17 of the periodic table of the elements; or two or more of $R_b^1$, $R_b^2$, $R_b^5$, and $R_b^4$ join together to form a $C_4$ to $C_{62}$ cyclic or polycyclic ring structure; and $R_b^5$ is a divalent $C_1$-$C_{20}$ hydrocarbyl radical, a divalent $C_1$-$C_{20}$ substituted hydrocarbyl radical, and/or a divalent functional group comprising elements from Group 13-17 of the periodic table of the elements.

E17. The process of any one of embodiments E1 through E16, wherein the hydroesterification catalyst comprises a Group 8, 9, or 10 metal, preferably Pd, coordinated with:

1,3-bis(diphenylphosphino)propane (dppp);
1,3-bis[bis(o-tolyl)phosphoryl]propane (dtpp)
1,3-bis[bis(mesityl)phosphoryl]propane (dmpp)
1,1'-bis(diphenylphosphino)ferrocene (dppf);
1,2-bis(diphenylphosphino)benzene (dppb);
bis(dicyclohexylphosphino)ethane;
1,2-bis(diisopropylphosphino)ethane;
1,2-bis(dimethylphosphino)ethane;
1,4-bis(diphenylphosphino)butane;
1,2-bis(diphenylphosphino)ethane;
bis(diphenylphosphino)methane;
triphenyl phosphine;
2,2'-bis(diphenylphosphino)-1,1'-binaphthyl);
4,4'-Bi-1,3-benzodioxole-5,5'-diylbis(diphenylphosphane);
4,4'-Bi-1,3-benzodioxole-5,5'-diylbis(di-2,4-dimethyl-phenylphosphane);
4,4'-Bi-1,3-benzodioxole-5,5'-diylbis(di-2,4-di(t-butyl)-3-methoxy-phenylphosphane);
4,5-Bis(diphenylphosphino)-9,9-dimethylxanthene;
2-Dicyclohexylphosphino-2',4',6'-triisopropylbiphenyl;
2-Dicyclohexylphosphino-2',6'-dimethoxybiphenyl;
2-(2-dicyclohexylphosphanylphenyl)-N1,N1,N3,N3-tetramethyl-benzene-1,3-diamine;
a dialkylbiaryl phosphine;
ethane-1,2-diylbis[(2-methoxyphenyl)phenylphosphane];
O-isopropylidene-2,3-dihydroxy-1,4-bis(diphenylphosphino)butane;
1,5-diaza-3,7-diphosphacyclooctane;
(oxydi-2,1-phenylene)bis(diphenylphosphine);
(2RS,3RS)-(–)-bis(diphenylphosphino)butane;
1,2-Bis[(2S,5S)-2,5-di-($C_1$-$C_{20}$ hydrocarbyl) phospholano]benzene;
or a combination thereof.

E18. The process of any one of embodiments E1 through E18, wherein the hydroesterification catalyst comprises a Group 8, 9, or 10 metal, preferably Pd, coordinated with one or more of ligands (I) through (X):

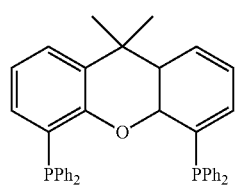

(I)

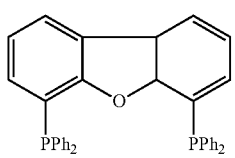

(II)

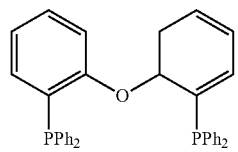

(III)

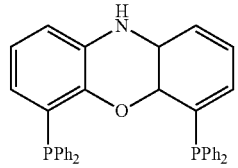

(IV)

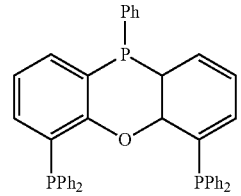

(V)

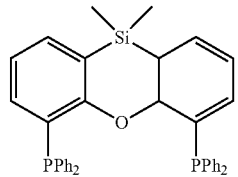

(VI)

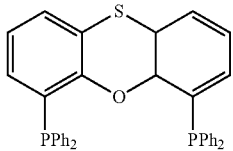

(VII)

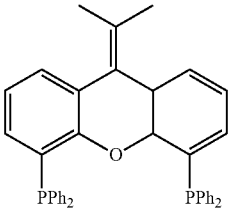

(VIII)

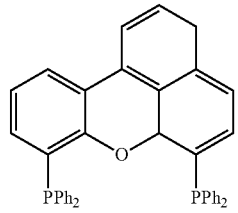

(IX)

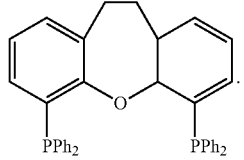

(X)

E19. The process of any one of embodiments E1 through E18, wherein the reaction temperature is greater than or equal to about 50° C.

E20. The process of any one of embodiments E1 through E19, wherein a CO partial pressure in the reactor is greater than or equal to about 5 Bar, or greater than or equal to about 10 Bar.

E21. The process of any one of embodiments E1 through E20, wherein each catalyst is present in the reaction medium at greater than or equal to about 0.5 mol %, based on the total amount of the reaction medium present.

E22. The process of any one of embodiments E1 through E21, wherein the reaction period of time is greater than or equal to about 1 minute.

E23. The process of any one of embodiments E1 through E22, wherein the solvent is a halogenated hydrocarbon comprising from 1 to 10 carbon atoms, a halogenated aromatic hydrocarbon comprising from 1 to 20 carbon atoms, or a combination thereof.

E24. The process of any one of embodiments E1 through E23 wherein the solvent comprises methylene chloride, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, 1,1-dichloroethylene, 1,2-dichloroethylene, or a combination thereof.

E25. The process of any one of embodiments E1 through E24 wherein the solvent consists essentially of 1,1,2,2-tetrachloroethane.

E26. The process of any one of embodiments E1 through E25 wherein the solvent comprises a halogenated hydrocarbon according to the general formula:

wherein, $a+b+c+d+e+f+g+h+i+j=6$; and $b+c+d+e+g+h+i+j\geq 1$, preferably $b+c+d+e+g+h+i+j\geq 2$.

E27. The process of any one of embodiments E1 through E26, wherein the solvent comprises one or more halogenated aromatic $C_1$-$C_{10}$ hydrocarbons comprising one or more halogen substitutions.

E28. The process of any one of embodiments E1 through E27, wherein the solvent comprises dichlorobenzene and/or dichlorotoluene.

E29. The process of any one of embodiments E1 through E28, wherein the molar ratio of alpha-olefin to alpha-omega enol in the reaction medium is from about 1:99 to 99:1.

E30. The process of any one of embodiments E1 through E29, wherein the polyketoester comprises long chain branching having 7 carbon atoms or more, present at greater than or equal to about 5 long chain branches per 1000 carbon atoms.

E31. The process of any one of embodiments E2 through E29, wherein the olefinic-polyketoester comprises long chain branching having 7 carbon atoms or more, present at greater than or equal to about 5 long chain branches per 1000 carbon atoms.

E32. A polyketoester produced according to any one of embodiments E1 through E30.

E33. An olefin-polyketoester produced according to any one of embodiments E2 through E29 or E31.

E34. A polyketoester having an empirical formula:

$(A)_a(B)_b(C)_c(D)_d$ wherein:
a>0, b≥0, c>0, and d≥0;
a+b+c+d>100;
moieties A, B, C, and D may be arranged randomly, in blocks, or in any order;

moiety A has the general formula:

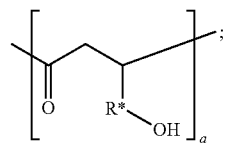

moiety B having the general formula:

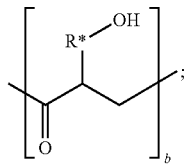

moiety C having the general formula:

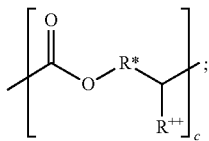

and
moiety D having the general formula:

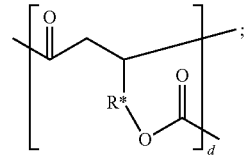

and
wherein $R^{++}$ is H, or a polyketoester chain having the empirical formula $(A)_a (B)_b (C)_c (D)_d$; wherein a>0, b≥0, c>0, and d≥0.

E35. The polyketoester according to embodiment E32 or E34, comprising long chain branching having 7 carbon atoms or more, present at greater than or equal to about 5 long chain branches per 1000 carbon atoms.

E36. An olefin-polyketoester having an empirical formula:

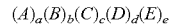

wherein:
a>0, b≥0, c>0, d≥0, and e>0;
a+b+c+d+e>100;
moieties A, B, C, D and E may be arranged randomly, in blocks, or in any order;
moiety A has the general formula

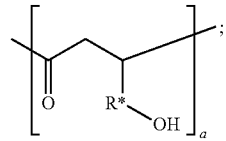

moiety B having the general formula:

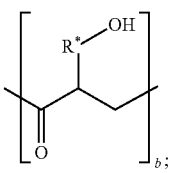

moiety C having the general formula:

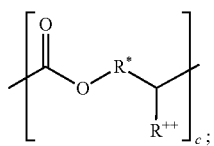

moiety D having the general formula:

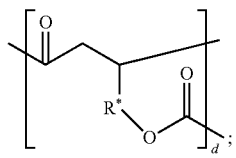

moiety E having the general formula:

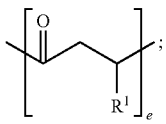

$R^1$ is H or a hydrocarbyl comprising 1 to 18 carbon atoms; and
$R^{++}$ is H, or a polyketoester chain having the empirical formula:

$(A)_a(B)_b(C)_c(D)_d(E)_e$ wherein $a>0$, $b\geq0$, $c>0$, $d\geq0$; and $e>0$.

E37. The olefinic-polyketoester according to embodiment E33 or E36, comprising long chain branching having 7 carbon atoms or more, present at greater than or equal to about 5 long chain branches per 1000 carbon atoms.

EXPERIMENTAL

The foregoing discussion can be further described with reference to the following non-limiting examples.

In the following examples, the process includes perturbation of olefin-CO copolymerization catalysis by chain transfer hydroesterification as a new synthetic route to polyesters, polyketoesters, and olefin-polyketoesters. The process utilizes two very well-known, yet mutually exclusive catalytic processes—olefin/CO copolymerization and olefin hydroesterification—which proceed through the same catalytic intermediate, a metal-acyl.

Two classes of polymerizations and chain transfer reagents are explored. Vinyl benzyl alcohol (VBA) polymerizations were utilized to demonstrate the concept in which the monomer serves as both the olefin for olefin/CO copolymerization and a hydroesterification chain transfer agent (CTA). In another example, 1-hexene/CO copolymerizations where conducted in the presence of an α,ω-enol utilized as the CTA. Each of these model systems allowed for examination of rates of olefin/CO copolymerization and hydroesterification as a function of ligand structure and electronic character, and were subsequently utilized to parameterize these reactions via Sigman's multivariate analysis method.

Unlike related carbonylation reactions such as hydroformylation, this approach is new and novel in the art such that our understanding of the dependence of catalyst structure on reactivity and selectivity is empirical derived for both reactions under investigation.

VBA was selected for exploration of a tandem catalysis system: two ligands in one-pot doing olefin-CO copolymerization (Drent-type P,O ligands) and hydroesterification (PPh$_3$) according to the general reaction:

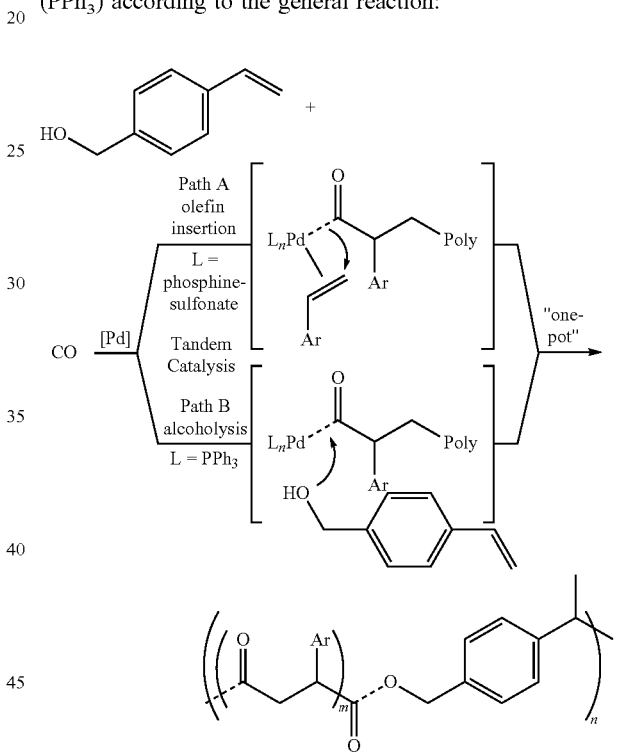

The olefin CO/copolymerization and hydroesterification are typically conducted in different solvents since olefin CO/copolymerization is known to be inactive in solvents suitable for hydroesterification, and hydroesterification is known in the art to be inactive in solvents suitable for olefin CO/copolymerization. Accordingly, it was necessary to determine a solvent where both polyketone formation and hydroesterification can both occur at similar rates. For example, styrene-CO copolymerization with NAN ligands such as bipyridine and phenanthroline performs very well only in protic solvents like methanol, but previously-developed styrene hydroesterification do not work in such solvents. It was discovered, however, that Drent-type P,O ligands are compatible with arene and halogenated solvents typically used for hydroesterification, and thus were selected for evaluation according to the following tandem catalytic reaction strategy for VBA polyketoester synthesis.

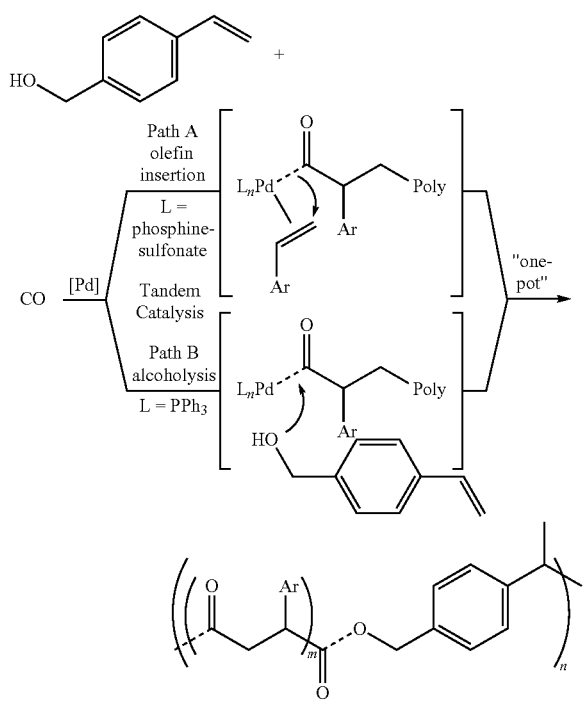

Solvent screening resulted in selection of 1,1,2,2-tetrachloroethane (TCE), which was found to be the best solvent for both catalyst systems (A and B) and was evaluated according to the following reaction scheme:

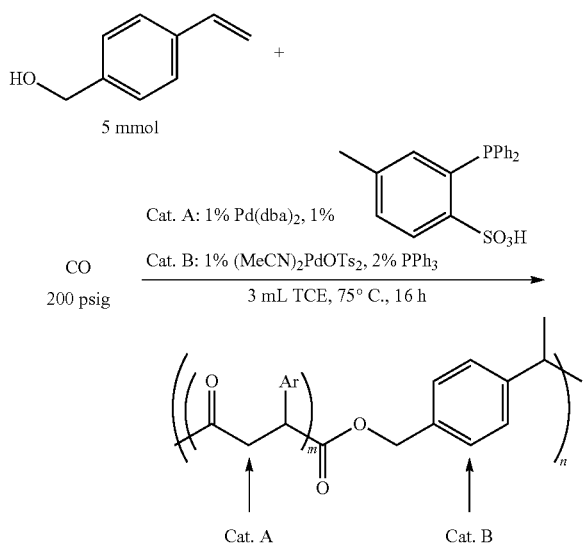

Figure 1B:
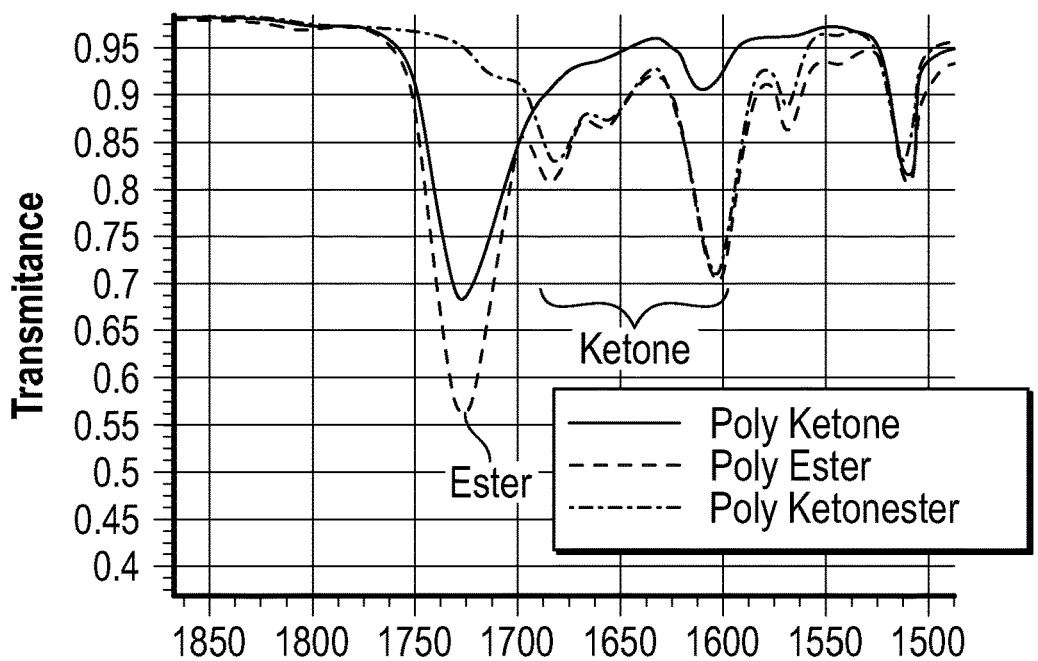
FIG. 1B is an IR spectrum of the resulting polymer from FIG. 1A showing CO=O stretches for both ketone and ester in the polymer according to embodiments of the invention.

As shown in FIGS. 1A and 1B, full conversion of VBA could be achieved within 8 hours. Both the $^{1}$H-$^{13}$C HMBC NMR and IR spectra confirmed the presence of both ester and ketone linkages on the obtained polymer. It was discovered that the ratio of the two linkages can be controlled by varying the CO pressure and reaction temperature; higher pressure and temperature both lead to a greater ratio of ester versus ketone linkages.

Accordingly, it was discovered that under relatively simple conditions, the present invention allows one to have the desired reactions kinetically compete. Currently, we are determining whether the styrene/CO linkages and the ester linkages are on the same polymer, or if the reactions are behaving independently.

Next the studies of 1-hexene/CO copolymerization and the hydroesterification of 1-hexene by 1-hexanol were conducted according to the following:

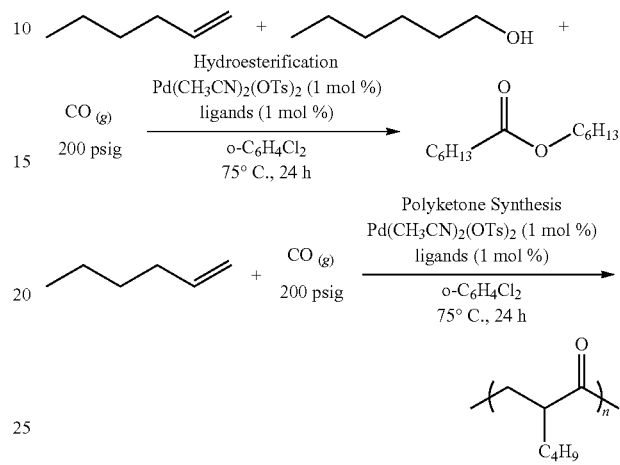

Figure 2:
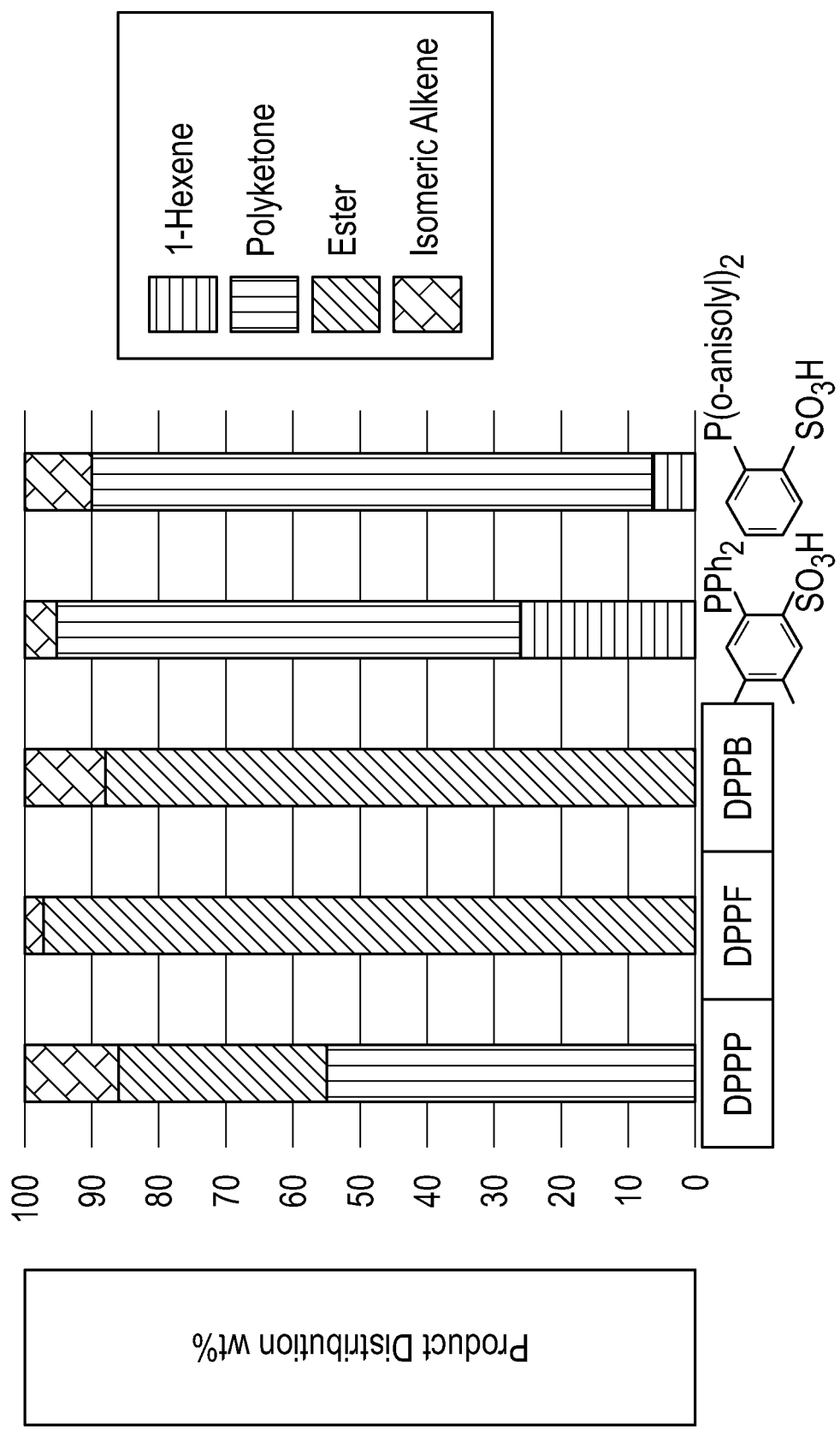
FIG. 2 is a graph showing the results of initial catalyst screening for hydroesterification according to embodiments of the invention.
Figure 3:
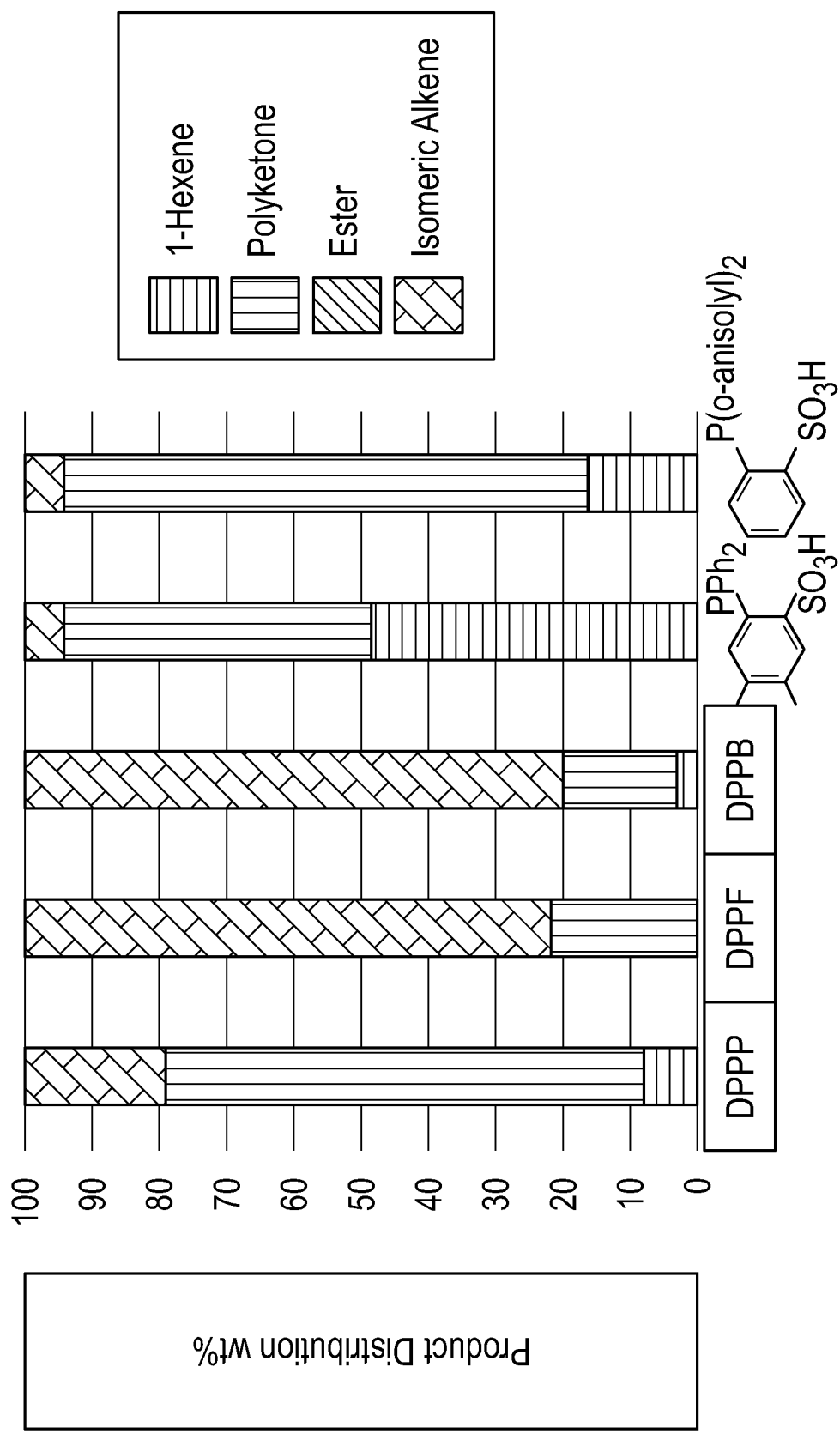
FIG. 3 is a graph showing the results of initial catalyst screening for polyketone formation via CO copolymerization according to embodiments of the invention.

The hydroesterification data is shown in FIG. 2 and the polyketone synthesis is shown in FIG. 3. As these data show, initial catalyst screening for hydroesterification and polyketone synthesis indicates that dppp and dppf architectures may be promising candidates for carrying out both reactions simultaneously.

Subsequently these two individual reactions were combined by using an α,ω-enol, such as hex-5-ene-1-ol or longer chain analogs. In view of the solvent evaluation and findings in the VBA reactions, o-dichlorobenzene was chosen as the solvent for these reactions.

Figure 4:
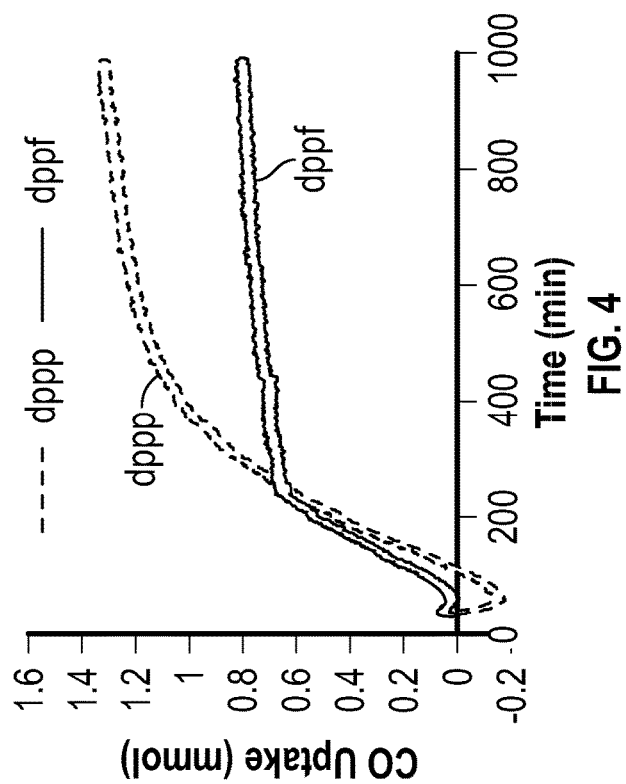
FIG. 4 is a graph showing Gas uptake reactions for polyketone synthesis with dppb and dppf under conditions reported in FIGS. 2 and 3.

As these data further show, quite remarkably it was discovered that one of our first tested ligands, bis(diphenylphosphino)propane (dppp) yields a mixture of polyketone and hexyl ester product (FIG. 2) under hydroesterification conditions. Similar results are also seen in the attempted polymerization of hex-5-en-1-ol with CO. This initial screen also indicates that 1,1'-bis(diphenylphosphino) ferrocene (dppf) and 1,2-bis(diphenylphosphino)benzene (dppb) architectures may be of potential interest, as they are competent for both hydroesterification (FIG. 3) and, to a lesser extent, polyketone formation (FIG. 2). Other ligands (dppm, dppe, bpy, alpha-diimines, and salicylaldimines) failed to yield polyketones under the test conditions. However, it was also discovered that gas uptake for the polyketone reactions with dppf and dppb was much lower than for dppp (see FIG. 4). Our continued exploration of these reactions has detailed kinetic measurements via gas uptake and an expansion of the explored ligand space so that we can properly parameterize the reactions with multivariate analysis.

Having identified dppp as a good candidate ligand for terpolymerization, next explored were conditions for optimization of the competition experiment across several pressures and temperatures according to the following:

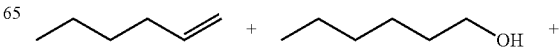

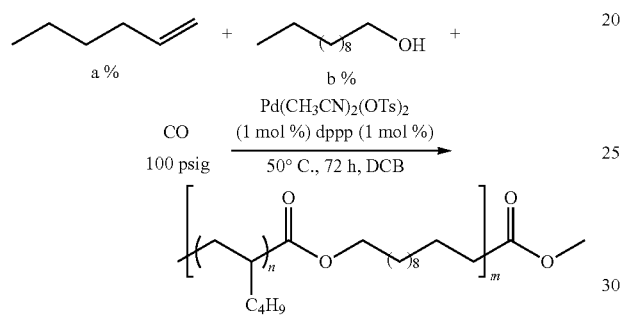

Figure 5:
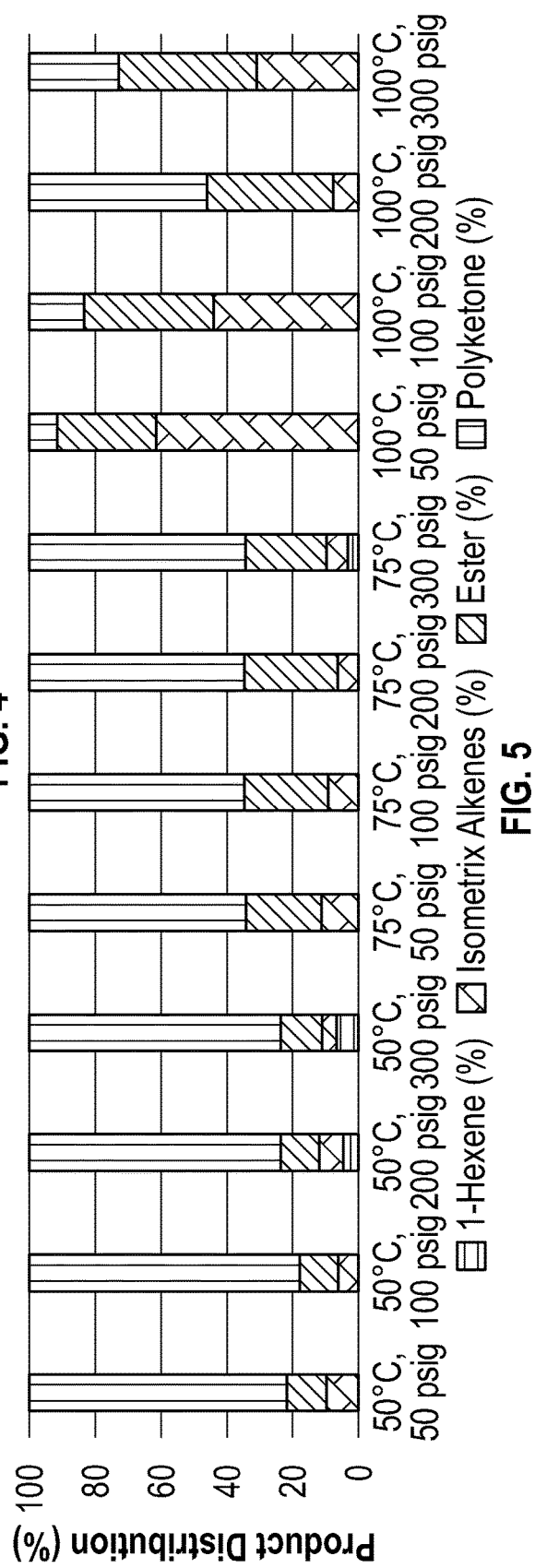
FIG. 5 is a graph showing temperature and pressure studies of model 1-hexene/1-hexanol reactions according to embodiments of the invention.

The results of these experiments are shown in FIG. 5. The reaction of 1-hexene, hexanol, and CO appears reasonably invariant to CO pressure, but the temperature has a dramatic effect on the product selectivity: temperatures in excess of 75° C. increase the amount of unwanted alkene isomerization dramatically. In this case, the isomerized internal alkenes react significantly more slowly toward productive catalysis.

Next the terpolymerization of 1-hexene, 10-undecenol, and CO was conducted at various ratios of the monomers according to the following:

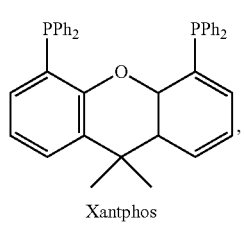

Figure 6:
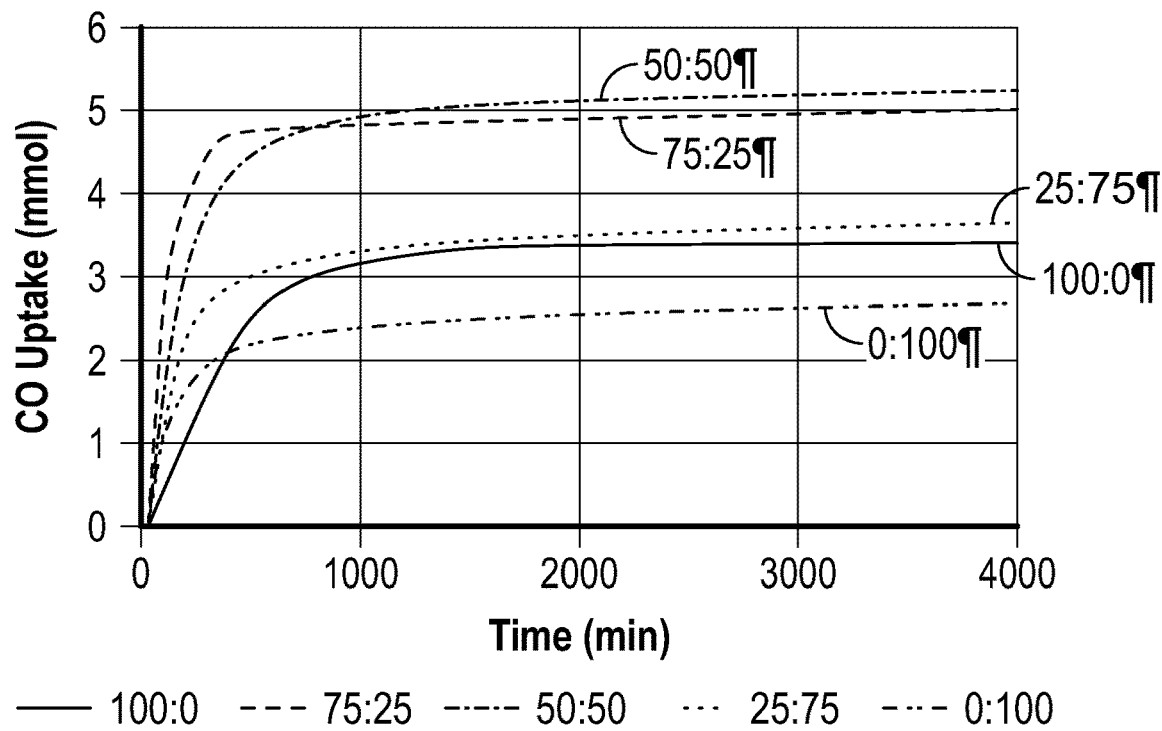
FIG. 6 is a graph showing CO uptake of terpolymerization of 1-hexene, 10-undecenol, and CO.
Figure 7:
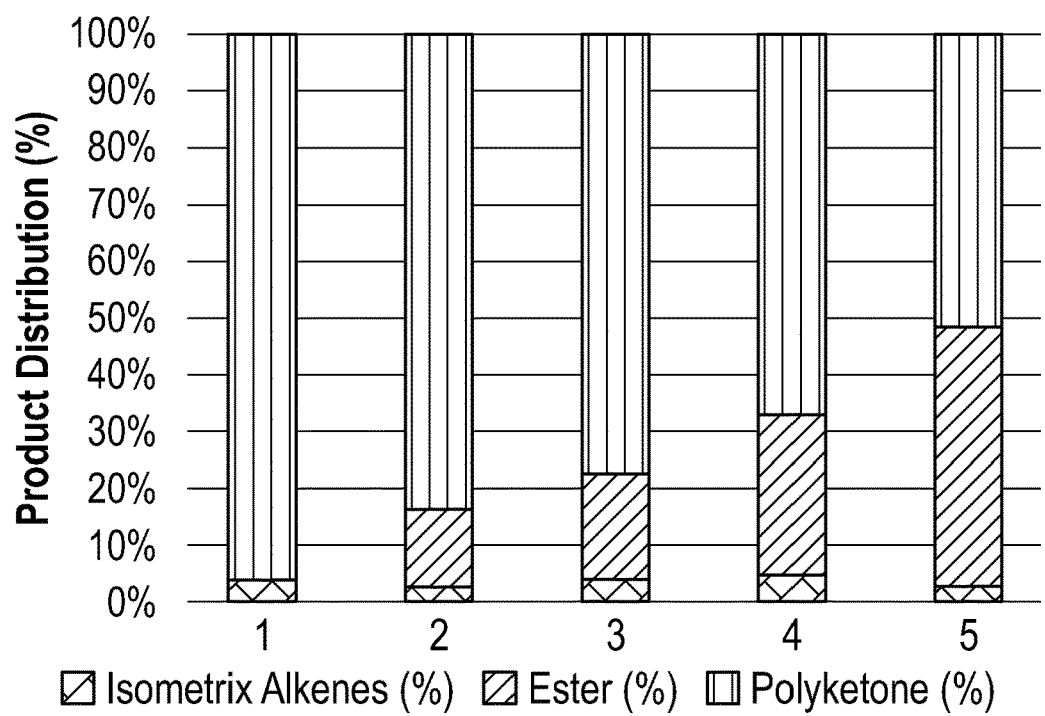
FIG. 7 is a graph showing the components produced by terpolymerization of 1-hexene, 10-undecenol, and CO according to embodiments of the invention.

The CO uptake of these experiments are shown in FIG. 6 and the results of these experiments are shown in FIG. 7. As FIG. 6 shows, the CO uptake of the 75:25 experiment was higher than the 25:75 experiment, and similar differences were seen between the 100:0 and 0:100 experiments. This indicates how changing the monomer concentration can ultimately impact hydroesterification and polyketone formation separately. $^1$H NMR analysis of the resultant polymeric material indicated the formation of the desired terpolymer, where the amount of ester incorporation could be tuned by changing the ratio of 1-hexene to 10-undecenol. NMR analysis indicates a mixture of branched and linear polymers, indicating another potential factor to manipulate.

In view of these exciting results, a more detailed ligand screen of mono- and bisphosphines was conducted using various derivatives of dppp. A range of commercially available phosphines was utilized. Initial results show neither simple Buchwald-type monophosphines nor triphenylphosphine derivatives with electron donor or withdrawing groups gives productive copolymerization or hydroesterification. This result convinces us that the focus of our ligand screening should be on bisphosphines. The two selected were:

Xantphos and

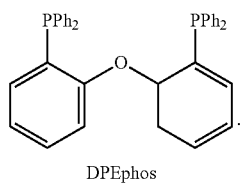

DPEphos

Figure 8:
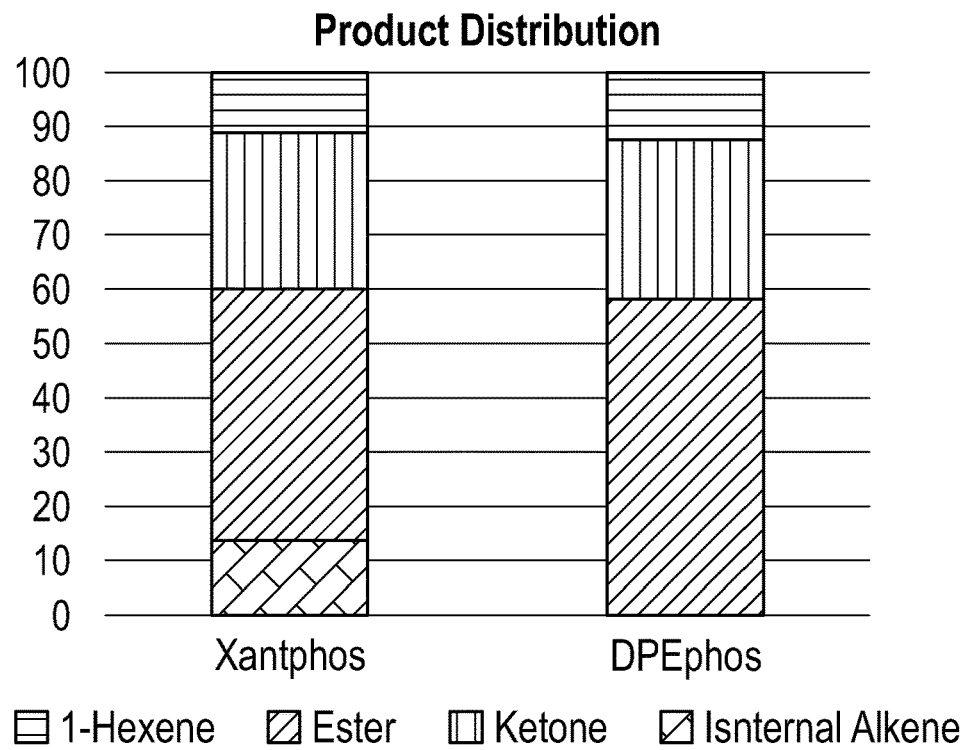
FIG. 8 is a graph showing product distribution for various phosphines in 1-hexene and 1-hexanol competition reactions according to embodiments of the invention.

Both catalysts gave comparable ester and ketone formation during the initial screening. These data are shown in FIG. 8.

For the bespoke-synthesized ligands, the aim was to systematically vary steric and electronic properties of diphenylphosphinopropane (dppp) ligand derivatives. Currently two dppp derivatives have been evaluated:

1,3-bis[bis(o-tolyl)phosphoryl]propane (dtpp)

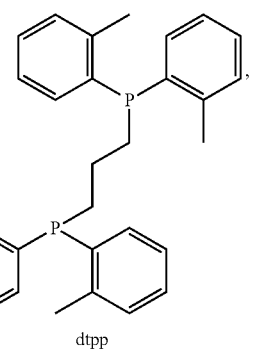

and
1,3-bis[bis(mesityl)phosphoryl]propane (dmpp),

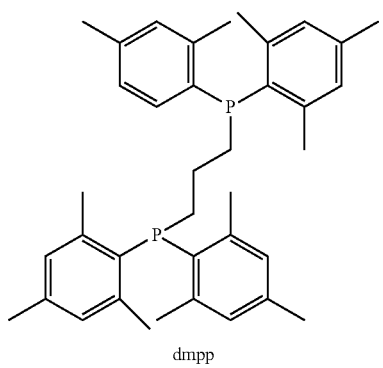

These have been tested under the optimized reactions conditions as follows:

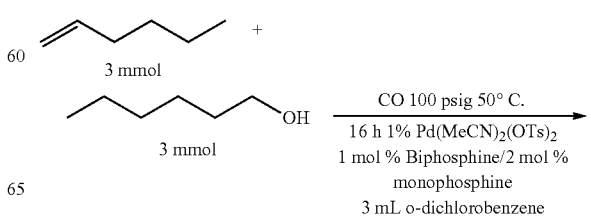

-continued

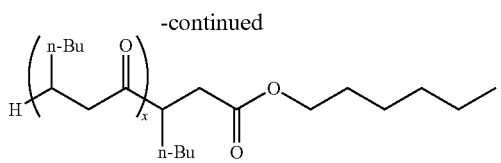

Figure 9:
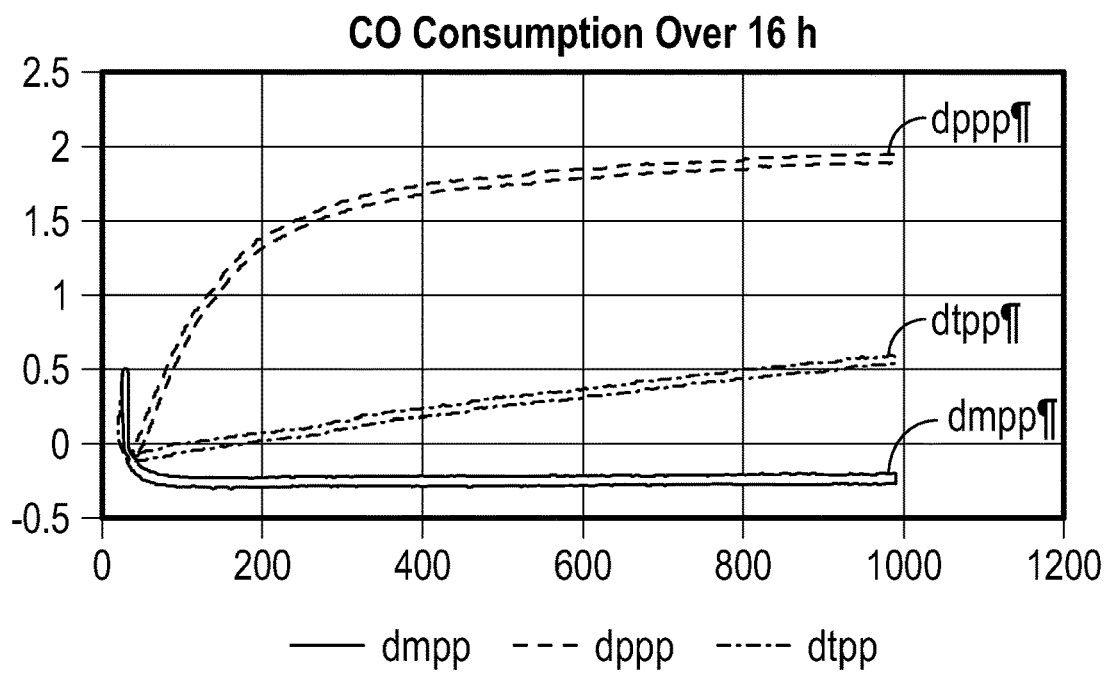
FIG. 9 is a graph showing CO uptake of the experiments shown in FIG. 8.

As shown in FIG. 9, CO consumption confirms that these two ligands present significantly lower activity compared to dppp.

Figure 10:
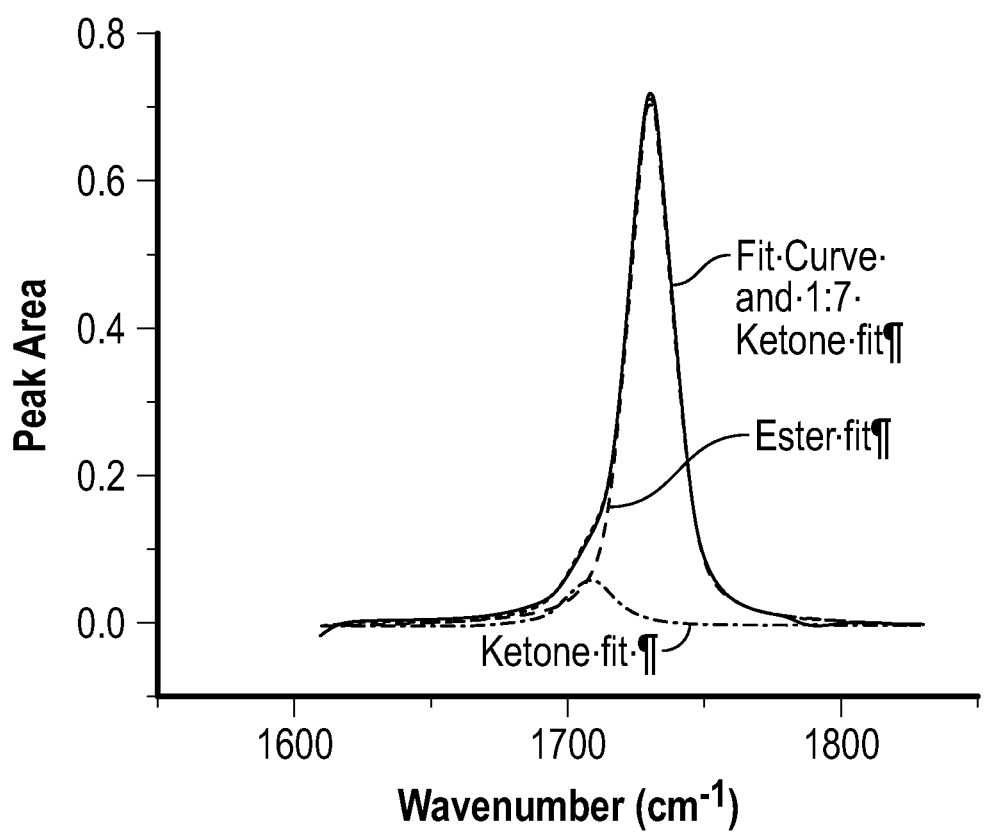
FIG. 10 is an FTIR of a mixed polyketoester from the reaction of 1-hexene, 1-hexanol, and CO.

Quantitative analysis of ketone and ester products from the ligand is convoluted by the fact that the $^1$H NMR signals of the ester and ketone products are overlapping. FTIR spectroscopy of the reaction mixtures represents a possible alternative to $^1$H NMR as the spectra are much less complicated. The polyester CO stretch frequency is found at 1730 cm$^{-1}$ and the polyketone CO stretch frequency is found at 1709 cm$^{-1}$. In addition, FTIR is an inexpensive and quick method which is appropriate for a large ligand screen. Polyketone and ester mixtures still require deconvolution of overlapping peaks, but the benefit of the IR spectrum is that there are only two easily identifiable signals. This is shown in FIG. 10.

Quantitative analysis of the polyketone/ester mixtures was carried out first by making calibration curves with polymer standards The polyester standard was synthesized from the hydroesterificative polymerization of 10-undecenol and CO. The polyketone standard was synthesized from the polymerization of 1-hexene and CO. The calibration curves were prepared using separate standard materials. Quantitative IR was performed on a series of polyketone and polyester mixtures of known concentrations. These data are shown in Table E1, which demonstrate that while the smaller component of the mixture is more difficult to quantify the larger component can be measured relatively accurately. A combination of an accurate measurement of the majority product and accurate measurement of the CO consumption may be able to give the minority component by difference. The accuracy of quantitative IR on reaction mixtures will be further evaluated, but this method appears to give satisfactory accuracy required for further ligand screening and measurement of relative rates of the two competing steps.

TABLE E1

Polyketone:Polyester ratios obtained by quantitative IR and errors based on known concentrations.

| Ketone:Ester ratio | Ester % Error | Ketone % Error |
|---|---|---|
| 6.9-1.0 | 4.1 | 38.4 |
| 2.5-1.0 | 4.2 | 19.2 |
| 1.0-1.0 | 4.7 | 8.4 |
| 1.0-2.5 | 10.8 | 2.4 |
| 1.0-7.1 | 25.8 | 1.3 |

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A polymerization process comprising:

contacting an alpha-omega enol having the general formula:

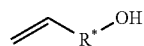

wherein R* is a divalent hydrocarbyl, a divalent hydrocarbyl substituted with one or more functional group comprising elements from Group 13-17 of the periodic table of the elements, or a combination thereof; and carbon monoxide (CO) in the presence of a hydroesterification catalyst and an olefin-CO copolymerization catalyst in a reaction medium within a reactor at a temperature, a CO pressure, and for a period of time sufficient to produce a polyketoester having an empirical formula:

$$(A)_a(B)_b(C)_c(D)_d$$

wherein a>0, b≥0, c>0, and d≥0;

moieties A, B, C, and D may be arranged randomly, in blocks, or in any order;

moiety A having the general formula:

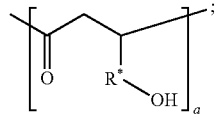

moiety B having the general formula:

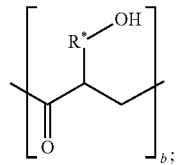

moiety C having the general formula:

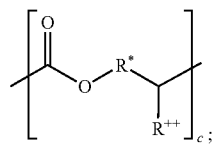

and
moiety D having the general formula:

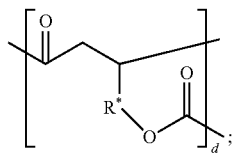

wherein $R^{++}$ is H, or a polyketoester chain having the empirical formula $(A)_a(B)_b(C)_c(D)_d$; wherein a>0, b≥0, c>0, and d≥0.

2. The process of claim 1, wherein the reaction medium further comprises an alpha olefin having the general formula:

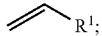

wherein $R^1$ is H or a hydrocarbyl comprising 1 to 18 carbon atoms;
to produce an olefin-polyketoester or a branched olefin-polyketoester having an empirical formula:

$(A)_a(B)_b(C)_c(D)_d(E)_e$ wherein a>0, b≥0, c>0, d≥0; and e>0;
moieties A, B, C, D and E may be arranged randomly, in blocks, or in any order;
moiety E having the general formula:

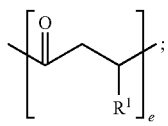

and
wherein $R^{++}$ is H, or an olefin-polyketoester chain having the empirical formula $(A)_a(B)_b(C)_c(D)_d(E)_e$; wherein a>0, b≥0, c>0, d≥0; and e>0.

3. The process of claim 2, wherein R* is a linear or branched divalent alkane radical having 1 to 19 carbon atoms.

4. The process of claim 2, wherein the R* comprises at least one divalent aromatic ring system.

5. The process of claim 4, wherein the alpha-omega enol is according to the formula:

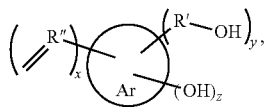

or

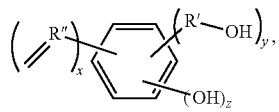

wherein Ar represents a cyclic or aromatic ring system in which x≥1 and y+z≥1;
each R', when present, is a divalent hydrocarbyl, a divalent hydrocarbyl substituted with one or more functional group comprising elements from Group 13-17 of the periodic table of the elements, or a combination thereof;
wherein each R" is a divalent hydrocarbyl, a divalent hydrocarbyl substituted with one or more functional groups comprising elements from Group 13-17 of the periodic table of the elements, or a combination thereof.

6. The process of claim 5, wherein the alpha-omega enol is according to the formula:

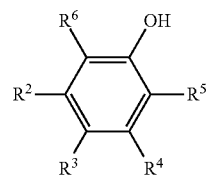

wherein each of $R^2$, $R^3$, $R^4$, $R^5$ and $R^6$ is, independently, a hydrogen, a $C_1$-$C_{20}$ hydrocarbyl radical, a functional group comprising elements from Group 13-17 of the periodic table of the elements, or a combination thereof, or wherein two or more of $R^2$, $R^3$, $R^4$, $R^5$ and $R^6$ independently join together to form a $C_4$ to $C_{62}$ cyclic or polycyclic ring structure subject to the proviso that at least one of $R^2$, $R^3$, $R^4$, $R^5$ and $R^6$ comprise a moiety having a terminal carbon-carbon double bond.

7. The process of claim 5, wherein the alpha-omega enol is according to the formula:

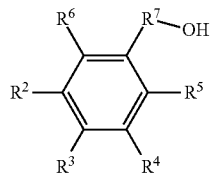

wherein x is from 1 to 20;
each of $R^2$, $R^3$, $R^4$, $R^5$ and $R^6$ is, independently, a hydrogen, a $C_1$-$C_{20}$ hydrocarbyl radical, a functional group comprising elements from Group 13-17 of the periodic table of the elements, or a combination thereof, or wherein two or more of $R^2$, $R^3$, $R^4$, $R^5$ and $R^6$ independently join together to form a $C_4$ to $C_{62}$ cyclic or polycyclic ring structure;
$R^7$ is a divalent $C_1$-$C_{20}$ hydrocarbyl radical, a divalent functional group comprising elements from Group 13-17 of the periodic table of the elements,
subject to the proviso that at least one of $R^2$, $R^3$, $R^4$, $R^5$ and $R^6$ comprises a moiety having a terminal carbon-carbon double bond.

8. The process of claim 1, wherein the olefin-CO copolymerization catalyst, the hydroesterification catalyst, or both comprise a metal from Groups 8, 9, or 10 of the periodic table of elements.

9. The process of claim 8, wherein each of the olefin-CO copolymerization catalyst, the hydroesterification catalyst, or both independently comprise Ni or Pd.

10. The process of claim 1, wherein the hydroesterification catalyst is produced in-situ via reaction of $M(L)_2+HA+P_dX_eY_f$ to form the hydroesterification catalyst active to produce the copolymer;
wherein M is Ni or Pd;
each L is independently a ligand comprising a hydrocarbyl, a substituted hydrocarbyl, a functional group comprising elements from Group 13-17 of the periodic table of the elements, or a combination thereof, or each of the two ligands L join together to form a single divalent $C_4$ to $C_{62}$ cyclic or polycyclic ring structure;
$A^-$ is the conjugate base of an acid;
$P_dX_eY_f$ is a phosphine ligand system comprising one or more phosphine moieties, each independently substituted with a combination of monovalent ligands X and divalent ligands Y;
each monovalent ligand X is independently a hydrocarbyl, a substituted hydrocarbyl, and/or a functional group comprising elements from Group 13-17 of the periodic table of the elements;
each divalent ligand Y is independently a hydrocarbyl, a substituted hydrocarbyl, and/or a functional group comprising elements from Group 13-17 of the periodic table of the elements;
$d \geq 1$; and
$e+2*f=3*d$.

11. The process of claim 10, wherein the olefin-CO copolymerization catalyst and the hydroesterification catalyst are the same.

12. The process of claim 1, wherein the olefin-CO copolymerization catalyst is a P—SO₃ bidentate Drent-type catalyst having the general formula:

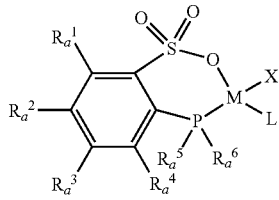

wherein M is a Group 8, 9, or 10 metal;
each of $R_a^1$, $R_a^2$, $R_a^3$, $R_a^4$, $R_a^5$, and $R_a^6$, is, independently, a hydrogen, a $C_1$-$C_{20}$ hydrocarbyl radical, a $C_1$-$C_{20}$ substituted hydrocarbyl radical, and/or a functional group comprising elements from Group 13-17 of the periodic table of the elements; or two or more of $R_a^1$, $R_a^2$, $R_a^3$, and $R_a^4$, and/or both of $R_a^5$, and $R_a^6$ join together to form a $C_4$ to $C_{62}$ cyclic or polycyclic ring structure;
wherein X is a monovalent functional group comprising elements from Group 13-17 of the periodic table of the elements; and
wherein L is Lewis base.

13. The process of claim 12, wherein M is Pd; $R_a^3$, is methyl; and $R_a^5$ and $R_a^6$ are phenyl.

14. The process of claim 12, wherein M is Pd; and $R_a^5$ and $R_a^6$ are ortho-anisolyl.

15. The process of claim 1, wherein the hydroesterification catalyst
comprises a Group 8, 9, or 10 metal coordinated with:
a diphosphine having the general formula:

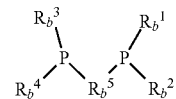

wherein each of $R_b^1$, $R_b^2$, $R_b^5$, and $R_b^4$, is, independently, a hydrogen, a $C_1$-$C_{20}$ hydrocarbyl radical, a $C_1$-$C_{20}$ substituted hydrocarbyl radical, and/or a functional group comprising elements from Group 13-17 of the periodic table of the elements; or two or more of $R_b^1$, $R_b^2$, $R_b^5$, and $R_b^4$ join together to form a $C_4$ to $C_{62}$ cyclic or polycyclic ring structure; and
$R_b^5$ is a divalent $C_1$-$C_{20}$ hydrocarbyl radical, a divalent $C_1$-$C_{20}$ substituted hydrocarbyl radical, and/or a divalent functional group comprising elements from Group 13-17 of the periodic table of the elements.

16. The process of claim 15, wherein the hydroesterification catalyst comprises a Group 8, 9, or 10 metal coordinated with:
1,3-bis(diphenylphosphino)propane (dppp);
1,3-bis[bis(o-tolyl)phosphoryl]propane (dtpp)
1,3-bis[bis(mesityl)phosphoryl]propane (dmpp)
1,3-bis((2-methoxyphenyl)(phenyl)phosphanyl)propane
1,1'-bis(diphenylphosphino)ferrocene (dppf);
1,2-bis(diphenylphosphino)benzene (dppb);
bis(dicyclohexylphosphino)ethane;
1,2-bis(diisopropylphosphino)ethane;
1,2-bis(dimethylphosphino)ethane;
1,4-bis(diphenylphosphino) butane;
1,2-bis(diphenylphosphino)ethane;
bis(diphenylphosphino) methane;
triphenyl phosphine;
2,2'-bis(diphenylphosphino)-1,1'-binaphthyl);
4,4'-Bi-1,3-benzodioxole-5,5'-diylbis(diphenylphosphane);
4,4'-Bi-1,3-benzodioxole-5,5'-diylbis(di-2,4-dimethylphenylphosphane);
4,4'-Bi-1,3-benzodioxole-5,5'-diylbis(di-2,4-di (t-butyl)-3-methoxy-phenylphosphane);
4,5-Bis (diphenylphosphino)-9,9-dimethylxanthene;
2-Dicyclohexylphosphino-2',4', 6'-triisopropylbiphenyl;
2-Dicyclohexylphosphino-2',6'-dimethoxybiphenyl;
2-(2-dicyclohexylphosphanylphenyl)-N1,N1,N3,N3-tetramethyl-benzene-1,3-diamine;
a dialkylbiaryl phosphine;
ethane-1,2-diylbis[(2-methoxyphenyl)phenylphosphane];
O-isopropylidene-2,3-dihydroxy-1,4-bis(diphenylphosphino) butane;
1,5-diaza-3,7-diphosphacyclooctane;
(oxydi-2,1-phenylene) bis(diphenylphosphine);
(2RS,3RS)-(−)-bis(diphenylphosphino) butane;
1,2-Bis [(2S,5S)-2,5-di-($C_1$-$C_{20}$ hydrocarbyl) phospholano] benzene;
or a combination thereof.

17. The process of any claim 15, wherein the hydroesterification catalyst comprises a Group 8, 9, or 10 metal coordinated with one or more of ligands (I) through (X):

(I) 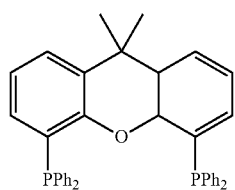

(II) 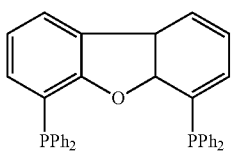

(III) 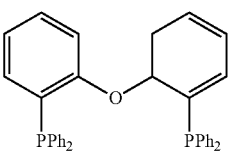

(IV) 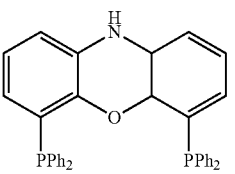

(V) 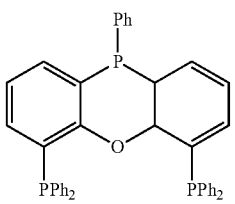

(VI) 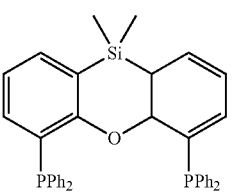

(VII) 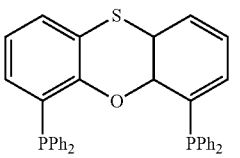

(VIII) 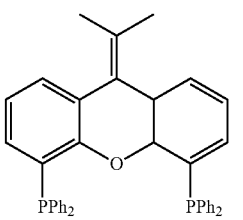

-continued (IX) 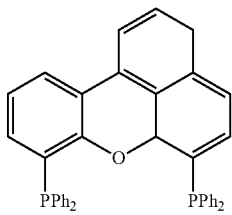

(X) 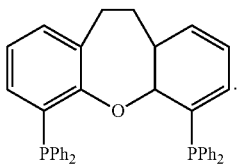

18. The process of claim 1, wherein:
the reaction temperature is greater than or equal to about 50° C.;
a CO partial pressure in the reactor is greater than or equal to about 5 Bar, or greater than or equal to about 10 Bar;
each catalyst is present in the reaction medium at greater than or equal to about 0.5 mol %, based on the total amount of the reaction medium present;
the period of time is greater than or equal to about 1 minute;
or a combination thereof.

19. The process of claim 1, wherein the reaction medium comprises a solvent, wherein the solvent is a halogenated hydrocarbon comprising from 1 to 10 carbon atoms, a halogenated aromatic hydrocarbon comprising from 1 to 20 carbon atoms, or a combination thereof.

20. The process of claim 1, wherein the reaction medium comprises a solvent, wherein the solvent is a tetrahaloethane;
a dihaloaromatic comprising 6 or more carbon atoms;
or a combination thereof.

21. The process of claim 2, wherein the molar ratio of alpha olefin to alpha-omega enol in the reaction medium is from about 1:99 to 99:1.

22. The process of claim 1, wherein the polyketoester comprises long chain branching having 7 carbon atoms or more, present at greater than or equal to about 5 long chain branches per 1000 carbon atoms.

23. The process of claim 2, wherein the olefinic-polyketoester comprises long chain branching having 7 carbon atoms or more, present at greater than or equal to about 5 long chain branches per 1000 carbon atoms.

24. A polyketoester produced according to claim 1.

25. A polyketoester having an empirical formula:

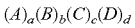

wherein:
a>0, b≥0, c>0, and d≥0;
a+b+c+d>100;
moieties A, B, C, and D may be arranged randomly, in blocks, or in any order;
moiety A has the general formula:

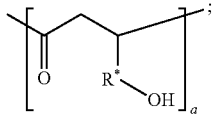

moiety B having the general formula:

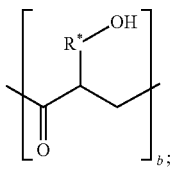

moiety C having the general formula:

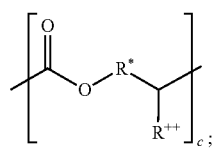

and moiety D having the general formula:

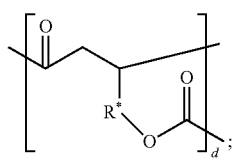

and wherein $R^{++}$ is H, or a polyketoester chain having the empirical formula $(A)_a(B)_b(C)_c(D)_d$; wherein a>0, b≥0, c>0, and d≥0.

26. The polyketoester according to claim 25, comprising long chain branching having 7 carbon atoms or more, present at greater than or equal to about 5 long chain branches per 1000 carbon atoms.

27. An olefin-polyketoester produced according to claim 2.

28. An olefinic-polyketoester having an empirical formula:

$(A)_a(B)_b(C)_c(D)_d(E)_e$ wherein:

a>0, b≥0, c>0, d≥0, and e>0;

a+b+c+d+e>100;

moieties A, B, C, D and E may be arranged randomly, in blocks, or in any order;

moiety A has the general formula:

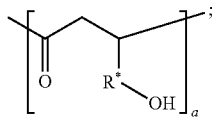

moiety B having the general formula:

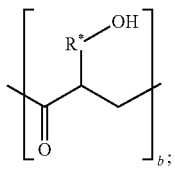

moiety C having the general formula:

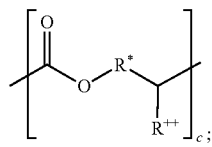

moiety D having the general formula:

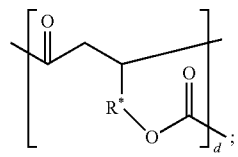

moiety E having the general formula:

$R^1$ is H or a hydrocarbyl comprising 1 to 18 carbon atoms; and $R^{++}$ is H, or a polyketoester chain having the empirical formula:

$(A)_a(B)_b(C)_c(D)_d(E)_e$, wherein a>0, b≥0, c>0, d≥0; and e>0.

29. The olefinic-polyketoester according to claim 27, comprising long chain branching having 7 carbon atoms or more, present at greater than or equal to about 5 long chain branches per 1000 carbon atoms.

* * * * *